(12) United States Patent
Yamashita et al.

(10) Patent No.: US 7,653,872 B2
(45) Date of Patent: Jan. 26, 2010

(54) DOCUMENT PROCESSOR, DOCUMENT PROCESSING METHOD AND STORAGE MEDIUM STORING DOCUMENT PROCESSING PROGRAM

(75) Inventors: Akio Yamashita, Kanagawa (JP); Kei Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 614 days.

(21) Appl. No.: 11/073,653

(22) Filed: Mar. 8, 2005

(65) Prior Publication Data
US 2006/0005117 A1   Jan. 5, 2006

(30) Foreign Application Priority Data
Jun. 30, 2004   (JP)   ............... 2004-194595

(51) Int. Cl.
*G06F 17/00* (2006.01)
(52) U.S. Cl. .................. 715/230; 715/232
(58) Field of Classification Search .......... 715/230–233
See application file for complete search history.

(56) References Cited

U.S. PATENT DOCUMENTS

| 5,742,736 | A * | 4/1998 | Haddock ............... 704/270 |
| 7,010,751 | B2 * | 3/2006 | Shneiderman ........... 715/232 |
| 2001/0042098 | A1 * | 11/2001 | Gupta et al. ............. 709/206 |
| 2002/0059342 | A1 * | 5/2002 | Gupta et al. ............. 707/512 |
| 2003/0023679 | A1 * | 1/2003 | Johnson et al. ........... 709/204 |
| 2003/0088623 | A1 * | 5/2003 | Kusuda .................. 709/204 |
| 2003/0163525 | A1 * | 8/2003 | Hendriks et al. ......... 709/204 |
| 2004/0205547 | A1 * | 10/2004 | Feldt et al. .............. 715/512 |
| 2005/0138540 | A1 * | 6/2005 | Baltus et al. ............ 715/511 |
| 2006/0100995 | A1 * | 5/2006 | Albornoz et al. ........... 707/3 |
| 2007/0043617 | A1 * | 2/2007 | Stein et al. ............. 705/14 |
| 2007/0300153 | A1 * | 12/2007 | Newman et al. .......... 715/530 |

FOREIGN PATENT DOCUMENTS

JP   8-50590 A   2/1996
JP   2001-147982 A   5/2001

OTHER PUBLICATIONS

"Topology" Archived Jun. 5, 1997 http://www.w3.org/DesignIssues/Topology.html.*
Sgouropoulou, Cleo et al.,Acquiring Working Knowledge through Asynchronous Multimedia Conferencing, Educational Technology & Society 3(3) 2000.*

* cited by examiner

*Primary Examiner*—Adam M Queler
(74) *Attorney, Agent, or Firm*—Sughrue Mion, PLLC

(57) ABSTRACT

A document processor has a function of attaching additional information to an electronic document and a function of associating linked information with the additional information. The document processor includes a display unit that displays the electronic document, the additional information, and the linked information, a judging unit that judges whether or not the linked information has changed since it was last referred to by a user, and a display control unit that controls the display unit so that a display state of the additional information varies according to the judgment result from the judging unit.

23 Claims, 22 Drawing Sheets

F I G. 3

DOCUMENT DATABASE DB1

| DOCUMENT ID | DOCUMENT NAME | DOCUMENT BODY |
|---|---|---|
| 0000 | doc001.txt | 1. FIRST ······ |
| 0001 | doc002.txt | THIS DOCUMENT ······ |
| 0002 | doc003.txt | BUDGET FOR THIS YEAR ······ |
| ⋮ | ⋮ | ⋮ |

STICKY ANNOTATION DATABASE DB2

| ANNOTATION ID | TERMINAL ID | USER ID | DOCUMENT ID | POSITION INFORMATION | DISPLAY NAME | LINK | PUBLIC ATTRIBUTE | STATUS | GENERATION TIME | REFERENCE TIME |
|---|---|---|---|---|---|---|---|---|---|---|
| 0001 | 0011 | USER1 | 0002 | P1 520-670 | ITEM A | http://MessageServer/threadViewer?MessageId=1517 | FRD | EXIST | 2004/03/3 19:10:15 | ... |
| 0002 | 0012 | USER2 | 0002 | P2 1030-1180 | ITEM B | http://MessageServer/threadViewer?MessageId=1518 | FRD | EXIST | 2004/03/3 17:25:45 | ... |
| 0003 | 0012 | USER2 | 0002 | P3 1740-1890 | ITEM C | http://MessageServer/threadViewer?MessageId=1519 | FRD | EXIST | 2004/03/3 18:18:23 | ... |
| ... | ... | ... | ... | ... | ... | ... | ... | ... | ... | ... |

REFERENCE TIME

| USER1 | USER2 | USER3 | USER4 | ... |
|---|---|---|---|---|
| 2004/3/5 18:00 | 2004/3/5 17:52 | 2004/3/5 10:02 | 2004/3/5 12:00 | ... |
| 2004/3/5 18:03 | 2004/3/5 17:58 | 2004/3/5 10:30 | 2004/3/5 12:05 | ... |
| 2004/3/6 12:11 | 2004/3/6 11:48 | 2004/3/6 11:32 | 2004/3/6 15:32 | ... |
| ... | ... | ... | ... | ... |

F I G. 4

F I G. 5

PEN-BASED INPUT ANNOTATION DATABASE DB3

| ANNOTATION ID | TERMINAL ID | USER ID | DOCUMENT ID | POSITION INFORMATION | ANNOTATION CONTENTS | COLOR CONFIGURATION | LINE TYPE | PUBLIC ATTRIBUTE | STATUS | GENERATION TIME |
|---|---|---|---|---|---|---|---|---|---|---|
| 0101 | 0011 | USER1 | 0002 | P1 1410-1515 | IMAGE INFORMATION 1 | RED, SQUARE | THIN 1 | FRD | DELETED | 2004/03/5 19:25:34 |
| 0102 | 0012 | USER2 | 0002 | P1 1620-1770 | IMAGE INFORMATION 2 | YELLOW | BOLD 1 | PRIV | EXIST | 2004/03/6 12:18:11 |
| 0103 | 0012 | USER2 | 0002 | P3 568-722 | IMAGE INFORMATION 3 | YELLOW | BOLD 1 | PRIV | EXIST | 2004/03/6 13:23:45 |
| ... | ... | ... | ... | ... | ... | ... | ... | ... | ... | ... |

FIG. 6

MESSAGE DATABASE DB4

| MESSAGE ID | UPDATE TIME | JUST-BEFORE MESSAGE ID | JUST-AFTER MESSAGE ID | TITLE | MESSAGE |
|---|---|---|---|---|---|
| 1517 | 2004/3/4 10:10:15 | 0 | 1520 | RESPONSE TO ITEM A | ... |
| 1518 | 2004/3/4 10:20:15 | 0 | 1521 | RESPONSE TO ITEM B | ... |
| 1519 | 2004/3/4 10:30:15 | 0 | 0 | RESPONSE TO ITEM C | ... |
| 1520 | 2004/3/4 20:50:25 | 1517 | 0 | RE:RESPONSE TO ITEM A | ... |
| 1521 | 2004/3/4 20:50:25 | 1518 | 0 | RE:RESPONSE TO ITEM B | ... |

FIG. 12

MESSAGE DATABASE DB4

| MESSAGE ID | UPDATE TIME | JUST-BEFORE MESSAGE ID | JUST-AFTER MESSAGE ID | TITLE | MESSAGE |
|---|---|---|---|---|---|
| 1517 | 2004/3/4 10:10:15 | 0 | 1520 | RESPONSE TO ITEM A | ... |
| 1518 | 2004/3/4 10:20:15 | 0 | 1521 | RESPONSE TO ITEM B | ... |
| 1519 | 2004/3/4 10:30:15 | 0 | 0 | RESPONSE TO ITEM C | ... |
| 1520 | 2004/3/4 20:50:25 | 1517 | 1522 | RE:RESPONSE TO ITEM A | ... |
| 1521 | 2004/3/4 20:50:25 | 1518 | 0 | RE:RESPONSE TO ITEM B | ... |
| 1522 | 2004/3/11 17:30:20 | 1520 | 0 | RE:RESPONSE TO ITEM A | ... |

F I G. 17

STICKY ANNOTATION DATABASE DB2

| ANNOTATION ID | TERMINAL ID | USER ID | DOCUMENT ID | POSITION INFORMATION | DISPLAY NAME | LINK | PUBLIC ATTRIBUTE | STATUS | GENERATION TIME | REFERENCE TIME |
|---|---|---|---|---|---|---|---|---|---|---|
| 0001 | 0011 | USER1 | 0002 | P1 520-670 | ITEM A | http://MessageServer/ threadViewer?MessageId= 1522 | FRD | EXIST | 2004/03/3 19:10:15 | ... |
| 0002 | 0012 | USER2 | 0002 | P2 1030-1180 | ITEM B | http://MessageServer/ threadViewer?MessageId= 1518 | FRD | EXIST | 2004/03/3 17:25:45 | ... |
| 0003 | 0012 | USER2 | 0002 | P3 1740-1890 | ITEM C | http://MessageServer/ threadViewer?MessageId= 1519 | FRD | EXIST | 2004/03/3 18:18:23 | ... |
| ... | ... | ... | ... | ... | ... | ... | ... | ... | ... | ... |

F I G. 19

MESSAGE DATABASE DB4

| MESSAGE ID | UPDATE TIME | JUST-BEFORE MESSAGE ID | JUST-AFTER MESSAGE ID | TITLE | MESSAGE | USER ID | RELATED MESSAGE ID |
|---|---|---|---|---|---|---|---|
| 1517 | 2004/3/4 10:10:15 | 0 | 1520 | RESPONSE TO ITEM A | ... | ... | |
| 1518 | 2004/3/4 10:20:15 | 0 | 1521 | RESPONSE TO ITEM B | ... | ... | |
| 1519 | 2004/3/4 10:30:15 | 0 | 0 | RESPONSE TO ITEM C | ... | ... | |
| 1520 | 2004/3/4 20:50:25 | 1517 | 0 | RE:RESPONSE TO ITEM A | ... | ... | |
| 1521 | 2004/3/5 10:50:25 | 1518 | 0 | RE:RESPONSE TO ITEM B | ... | UserX | 1517 |
| 1522 | 2004/3/11 17:30:20 | 1520 | 0 | RE:RESPONSE TO ITEM A | ... | ... | |

FIG. 21

STICKY ANNOTATION DATABASE DB2

| ANNOTATION ID | TERMINAL ID | USER ID | DOCUMENT ID | POSITION INFORMATION | DISPLAY NAME | LINK | PUBLIC ATTRIBUTE | STATUS | GENERATION TIME | REFERENCE TIME |
|---|---|---|---|---|---|---|---|---|---|---|
| 0001 | 0011 | USER1 | 0002 | P1 520-670 | ITEM A | http://MessageServer/threadViewer?MessageId=1517 | FRD | EXIST | 2004/03/3 19:10:15 | ... |
| 0002 | 0012 | USER2 | 0002 | P2 1030-1180 | ITEM B | http://MessageServer/threadViewer?MessageId=1518 | FRD | EXIST | 2004/03/3 17:25:45 | ... |
| 0003 | 0012 | USER2 | 0002 | P3 1740-1890 | ITEM C | http://MessageServer/threadViewer?MessageId=1519 | FRD | EXIST | 2004/03/3 18:18:23 | ... |
| ... | ... | ... | ... | ... | ... | ... | ... | ... | ... | ... |
| 0006 | 0015 | UserX | 0002 | P1 820-970 | REFERENCE ! | http://MessageServer/threadViewer?MessageId=1521 | FRD | EXIST | 2004/03/5 11:50:25 | ... |

DOCUMENT PROCESSOR, DOCUMENT PROCESSING METHOD AND STORAGE MEDIUM STORING DOCUMENT PROCESSING PROGRAM

This application claims priority to Japanese Patent Application No. 2004-194595, filed in the Japanese Patent Office on Jun. 30, 2004, the disclosure of which is incorporated herein by reference.

BACKGROUND OF THE INVENTION

1. Field of the Invention

The present invention relates to a document processor, a document processing method and a document processing program, and more particularly to a document processor having a function of attaching additional information to an electronic document and a function of associating link information with the additional information, a document processing method in the document processor, and a document processing program that is executed in the document processor.

2. Description of the Related Art

Conventionally, there are a number of techniques for supporting the cooperative preparation of a document, such as the preparation of a device design or a device manual.

First, there is a technique in which an update time for information in a document file is stored in advance, and when the information is read out of the document file, a judgment is made as to whether or not the information has been updated since a user last referred to the update time. The updated information is then identifiably displayed according to the judgment (for example, refer to Japanese Published Unexamined Patent Application No. Hei 8-50590).

Also, there is a technique in which a relation between a report or document and a comment is held in an activity report, thereby making the history of activity relating to the relation between the report or document and the comment and the tracking of the comment easy. In the technique, a chain is formed, including a report group and a comment group, composed of the relationships between the various reports and comments, thereby making the extraction and use of information easy (for example, refer to Japanese Published Unexamined Patent Application No. 2001-147982).

Incidentally, in recent years, a technique has been used in which additional information such as character information, image information, sound information or link information may be attached to an arbitrary position within an electronic document without effecting the body of the electronic document. In the present specification, the additional information may also be referred to as an "annotation".

A system that allows an annotation to be attached to an electronic document is exemplified by DocuWorks (registered trademark) of Fuji Xerox Co., Ltd. or Acrobat (registered trademark) of U.S. Adobe Corporation.

However, according to the technique that identifiably displays the updated document information, although an updated document can be accessed, the linked information is not taken into consideration. Therefore, there arises such a problem that the user cannot access whether the state of the linked information has changed since the last time it was referred to.

Similarly, according to the technique in which the relation between a report and a comment is held in an activity report, the comment is not taken into consideration when determining whether the report has been updated. Therefore, there arises such a problem that the user cannot access whether the state of the linked comment has changed from the last time it was referred to.

SUMMARY OF THE INVENTION

The present invention has been made in view of the above circumstances, and therefore provides a document processor, a document processing method and a document processing program which allow a user to readily access a state of linked information (e.g. a comment) related to an electronic document changes from a state that has been previously referred to.

According to an embodiment of the present invention, there is provided a document processor having a function of attaching additional information (e.g. an annotation) to an electronic document and a function of linking other information (e.g. a comment) to the annotation. The processor includes a display unit that displays the electronic document, the additional information and the linked information; a judging unit that judges whether or not the linked information has changed since it was previously referred to by a user; and a display control unit that controls the display unit so that a display state of the additional information associated varies according to the judgment result from the judging unit.

BRIEF DESCRIPTION OF THE DRAWINGS

These and other features, aspects, and advantages of the present invention will become better understood with reference to the following description and accompanying drawings, which should not be read to limit the invention in any way, in which:

FIG. 3 is a schematic diagram showing an example of a data structure of a document database according to exemplary embodiment;

FIG. 4 is a schematic diagram showing an example of a data structure of a sticky annotation database according to exemplary embodiment;

FIG. 5 is a schematic diagram showing an example of a data structure of a pen-based input annotation database according to exemplary embodiment;

FIG. 6 is a schematic diagram showing an example of a data structure of a message database according to exemplary embodiment;

FIG. 12 is a schematic diagram showing an update state of a message database DB4 according to a change in the message state shown in FIG. 11;

FIG. 17 is a schematic diagram showing an example of altering the state of a sticky annotation by an annotation display updating program according to the second exemplary embodiment;

FIG. 19 is a schematic diagram showing an example of a data structure of a message database according to a third exemplary embodiment;

FIG. 21 is a schematic diagram showing an example of altering the state of a sticky annotation by an annotation display updating program according to the third exemplary embodiment.

DETAILED DESCRIPTION OF THE INVENTION

Now, a description will be given in more detail of exemplary embodiments of the present invention with reference to the accompanying drawings. In the present specification, a description is given of a document processor, a document processing method, and a document processing program, each applied to a document processing system that is structured as a client/server system.

First Exemplary Embodiment

System Structure

Figure 1:
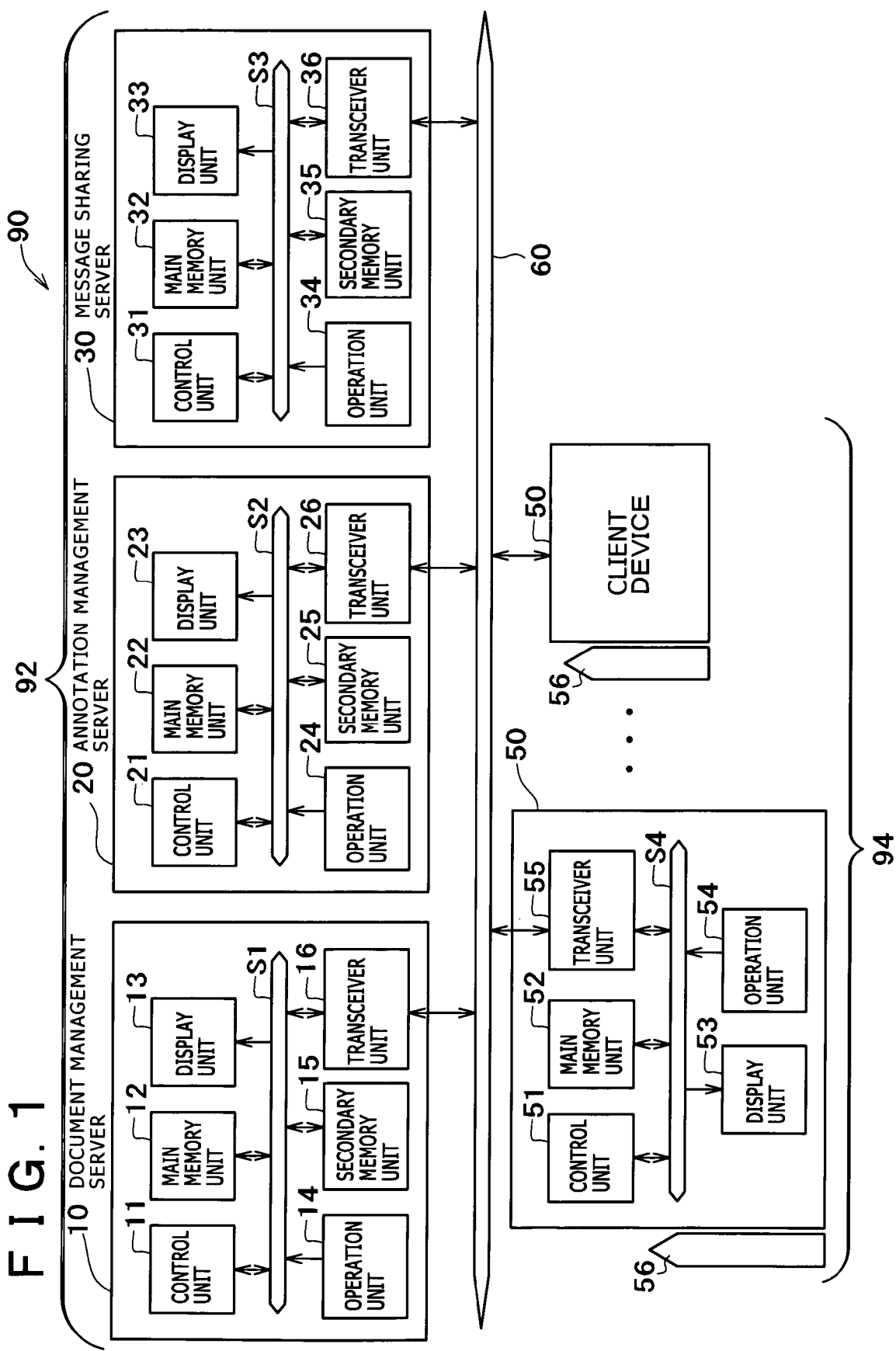
FIG. 1 is a diagram showing the structure of a document processing system according to an exemplary embodiment of the present invention.

FIG. 1 is a diagram showing the structure of a document processing system 90 according to the first exemplary embodiment.

As shown in the figure, the document processing system 90 includes a server system 92 and a client system 94. The document processing system 90 processes electronic data (not limited to document data) which is used in the document processing system 90. The client system 94 is used by a user of the document processing system 90.

The server system 92 includes a document management server 10 that manages an electronic document (hereinafter also referred to simply as "a document"), and an annotation management server 20 that manages an annotation. The document management server 10 saves and retrieves a document, and the annotation management server 20 saves and retrieves annotations associated with the document.

The document management server 10 and the annotation management server 20, as described above, make it possible to prevent a final electronic document, the contents of a document, the addition or correction of a document from contradicting each other. This is the case even if a number of electronic documents are available for addition or alteration by a number of users, simultaneously.

For example, even if a supplementary explanation is added as an annotation to some portion of an original electronic document by one user, while another user deletes the same portion of the original document, those actions are both registered by an annotation management server 20 in association with the electronic document body that is managed by the document management server 10. Thereby, it is possible to manage the information without any contradiction between the electronic document body and any additions to or alterations of the electronic document body.

As shown in FIG. 1, the document management server 10 includes a control unit 11 that controls the operation of the entire document management server 10; a main memory unit 12 for storing various information; a display unit 13; an operating unit 14, made up of a keyboard and a mouse (pointing device); a secondary memory unit 15, for storing a document database DB1, various programs, and various parameter information which will be described later; and a transceiver unit 16. These respective units are electrically connected to each other through a system bus S1. That is, the document management server 10 according to this embodiment may be a general personal computer (hereinafter referred to as a PC).

Similarly, the annotation management server 20 includes a control unit 21 that controls the operation of the entire annotation management server 20; a main memory unit 22 for storing various information; a display unit 23; an operating unit 24, made up of a keyboard and a mouse; a secondary memory unit 25, for storing a sticky annotation database DB2, a pen-based input annotation database DB3, various programs, and various parameter information, which will be described later; and a transceiver unit 26 that controls the transmission and reception of various information with respect to an external device. These respective units are electrically connected to each other through a system bus S2. That is, the annotation management server 20 according to this embodiment may be of a general personal computer.

Also, the server system 92 according to this embodiment has a message sharing server 30 that functions as a bulletin board system. The message sharing server 30 saves and retrieves a message exchanged on the bulletin board system.

As shown in the figure, the message sharing server 30 also includes a control unit 31 that controls the operation of the entire message sharing server 30; a main memory unit 32 for storing various information; a display unit 33; an operating unit 34, made up of a keyboard and a mouse; a secondary memory unit 35 for storing a message database DB4, various programs, and various parameter information, which will be described later; and a transceiver unit 36 that controls the transmission and reception of various information with respect to an external device. These respective units are electrically connected to each other through a system bus S3. That is, the message sharing server 30 according to this embodiment may be a general personal computer.

The client system 94 has a client device 50 and a pen type annotation device 56, used for inputting information to the client device 50. These may be provided for each user of the document processing system 90.

As shown in FIG. 1, the client device 50 also includes a control unit 51 that controls the operation of the entire client device 50; a main memory unit 52 for storing various information; a display unit 53; an operating unit 54, made up of a keyboard and a mouse; and a transceiver unit 55, that controls the transmission and reception of various information with respect to an external device. These respective units are electrically connected to each other through a system bus S4.

The client device 50 is so structured as to display an image on the display unit 53 on the basis of data read from the main memory unit 52 or on the basis of data acquired from the server system 92 through the transceiver unit 55.

According to this embodiment, the client device 50 is a tablet PC having a display unit 53 with a touch panel display (not shown). The annotation device 56 can be used to create handwriting input by "writing" on the surface of the display unit 53.

In this example, a controller for the handwriting input is used to merely recognize and process data inputted by handwriting as "digital ink (handwritten character)." The controller may also provide a function of converting the handwritten input into text (handwritten character recognizing function), though this function is not required. The controller can retrieve the handwritten character as it is or can process the character (color alteration, etc.). A digital ink data format may be used as image data (for example, bit map data).

As described above, the client device 50 can accept writing input from the annotation device 56 to simulate making marks such as underlining, circles, or highlighting on a paper document.

The client device 50 also has a sticky attaching function that allows a note (a "sticky") of a predetermined configuration (e.g. a rectangle) to be attached to an arbitrary position of a document displayed on the display unit 53. A comment may be directly inscribed on the sticky or the sticky may include link information, linking the sticky to a linked comment or to a related article. When the link information is included on the sticky, a mark of a predetermined configuration (e.g. a square), indicating that a link is included on the sticky, may be displayed. In a document processing system 90 according to this embodiment, the sticky is an annotation.

As described above, the client device 50 allows a sticky to be attached at an arbitrary position within a document such as a remarkable portion if the document or a portion of the document that requires a supplementary explanation, thereby imitating a case of sticking a sticky note onto a paper document.

The document processing system 90 is structured such that the document management server 10, the annotation management server 20, the message sharing server 30, and the plural client devices 50, as described above, are all electrically connected to each other by a network 60. In this embodiment, the network 60 is an internet network. However, the present invention is not limited to such an example, and various networks, such as an intranet, a LAN (local area network), a VAN (value added network), a telephone line network, an echonet, a homePNA, or another network as would be understood by one of skill in the art, may be used.

The document management server 10, the annotation management server 20, and the message sharing server 30, according to this embodiment, function together as an HTTP (hypertext transfer protocol) server. The respective client devices 50 function as HTTP clients. The document management server 10, the annotation management server 20, the message sharing server 30, and the respective client devices 50 can access each other through the network 60.

Then, when annotation information is input into the client device 50 by a user handwriting through the annotation device 56 (hereinafter also referred to as "handwriting input annotation"), or by attachment as a sticky (hereinafter also referred to as "sticky annotation") the information is first stored in the main memory unit 52 of the client device 50. Thereafter, the information is transmitted to the annotation management server 20 through the network 60 at a predetermined timing, and then stored in association with the document body. Thereafter, in the client devices 50, information related to an annotation that has been added may be read together with the document body when the document body is read, and may be displayed by the display unit 53.

Structure of a Display Screen of the Display Unit 53 in the Client Device 50

Figure 2:
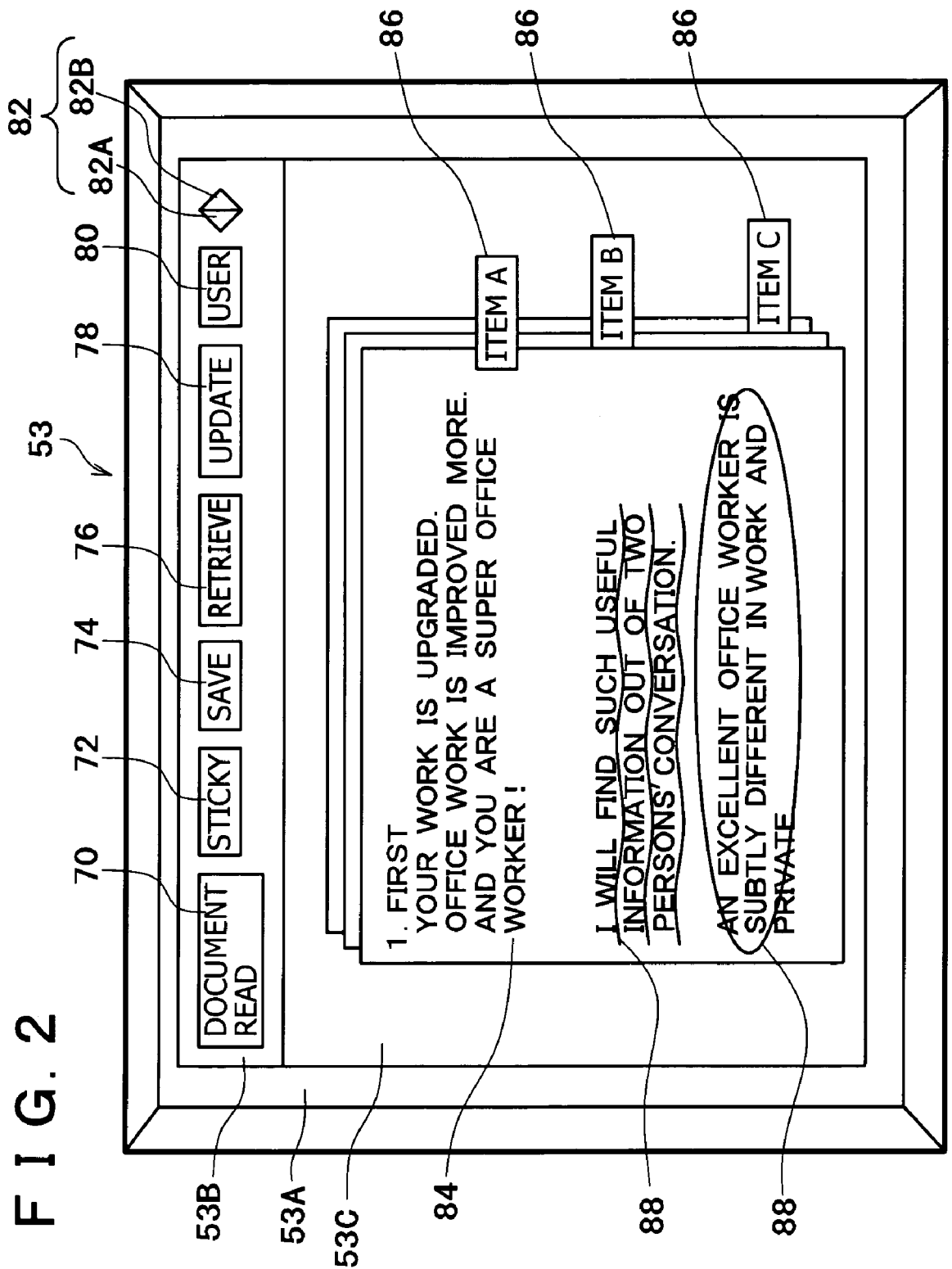
FIG. 2 is a schematic diagram showing an example of a display screen of a display unit in a client device according to an exemplary embodiment.

FIG. 2 is a schematic diagram showing an example of a display screen of the display unit 53 in the client device 50 according to an exemplary embodiment.

As shown in the figure, a display area 53A, in the display unit 53, is provided with a button display area 53B, for displaying plural buttons each having a function, and a document display area 53C, for displaying a document 84.

In this embodiment, a document read button 70, a sticky button 72, a save button 74, and a retrieve button 76 are provided on the button display area 53B as the above plural buttons. The document read button 70 is designated when a user wants to read a document that is managed (stored) in the document management server 10. The sticky button 72 is designated when a user wants to attach a the sticky annotation to the document. The save button 74 is designated when a user wants to save a sticky annotation 86 that is displayed in the display area 53C or a handwritten input annotation 88. The retrieve button 76 is designated when a user wants to retrieve and display an annotation that is managed (stored) in the annotation management server 20.

Also, included among the above plural buttons are an update button 78, that is designated when a user wants to update the display contents of the document display area 53C; a user button 80 that is designated when a user wants to display a list of users who have added annotations to the document that is displayed in the document display area 53C; and a page turning button 82, including a previous-page feed button 82A and a next-page feed button 82B, for turning the pages of a displayed document.

The client device 50 may function to "turn the pages" of a displayed document like reading a book and is designed to enable quick retrieval of desired information from a large amount of downloaded information by using the page turning display function.

The previous-page feed button 82A and the next-page feed button 82B are displayed simultaneously with the pertinent document and may be indicated by the annotation device 56, the keyboard, or the mouse of the operating unit 54, thereby making it possible to display desired page information on the display unit 53 while conducting page turning operation.

The other buttons describe above may also be indicated by the annotation device 56, or the keyboard or the mouse of the operating unit 54, thereby making it possible to execute the functions allocated to those buttons.

In the client device 50 according to this embodiment, as described above, the buttons for executing the various types of functions are provided in a software fashion by displaying the buttons in the display area 53A of the display unit 53. However, alternatively, hardware buttons can be located in the display unit 53 or the operating unit 54, or predetermined keys on the keyboard of the operating unit 54 can be used as the respective buttons instead.

Document Management Server 10 and Document Database DB1

The document management server 10 according to this embodiment receives "registration" and "document read" instructions from external devices.

The above "registration" is received through an external path such as a URL (uniform resource locator) of a document to be registered, which is indicative of an address at which the document is stored in the document database DB1, or a path of a directory, such as http://datacenter.company.co.jp/access.cgi?DocumentID=8gjk3c13.

The document management server 10 assigns a document ID to the document or group of documents indicated by the given path, and then registers a document name and a document body in the document database DB1 for each of the document IDs. One example of a data structure within the document database DB1 is shown in FIG. 3. The document name and the document body may be the path of the document such as a URL.

Then, when it is detected that the document read button 70 is designated at any one of the client devices 50, the client device 50 notifies the document management server 10 of the document read instructions. In response to this, the document management server 10 prepares a list of document names within the document database DB1 and transmits the list to the accessing client device 50.

In response to this, the client device 50 displays the list of document names, such as in a list box, and prompts the user to select a desired document name. When the desired document name is pointed to by the user by means of the annotation device 56, or the keyboard or mouse of the operating unit 54, the client device 50 transmits the designated document name to the document management server 10.

The document management server 10 reads, from the document database DB1, the document body and the document ID corresponding to the document name that has been received from the client device 50, and then transmits the document body and the document ID to the client device 50. As a result, the document body corresponding to the designated document name is displayed in the document display area 53C of the display unit 53 in the client device 50.

Annotation Management Server 20, Sticky Annotation Database DB2, and Pen-Based Input Annotation Database DB3

The annotation management server 20 according to this embodiment receives "save" and "retrieve" instructions from an external device.

That is, in any one of the client devices 50, an annotation is added to a document in a state where the document is displayed by the display unit 53, and when it is detected that the save button 74 is designated, the client device 50 notifies the annotation management server 20 of the information indicative of that fact. As a result, the annotation management server 20 associates the information related to the added annotation with the displayed document, and then registers (saves) the information. The information is registered (saved) in the annotation database DB2 when the annotation is a sticky annotation and in the pen-based input annotation database DB3 when the annotation is a handwritten input annotation.

That is, for example, when receiving an instruction of "save" from any one of the client devices 50, and when the annotation is a sticky annotator, the annotation management server 20 registers the annotation as follows.

First, the annotation management server 20 obtains, from the client device 50, the position information, indicative of a position at which the annotation to be saved; the display name of the annotation; a link when the annotation is linked; the document ID of the displayed document; and a terminal ID of the client device 50 that has instructed the saving. The annotation management server 20 also receives, from the client device 50, a user name (or a user ID) of the user who is given the annotation to be saved, a publication attribute related to the annotation, a status indicative of the state (new, existence, elimination) of the annotation, and a time at which the annotation is given.

Then, the annotation management server 20 saves the annotation ID, the terminal ID, the user ID (or the user name), the document ID, the position information, the display name, the link, the publication attribute, the status, the generation time, and the reference time in the sticky annotation database DB2 in a table format.

The document processing system 90 according to this embodiment can access the linked information when an annotation is linked. The information indicative of the time at which the information is referred to by the document processing system 90 is supplied to the annotation management server 20 from the message sharing server 30, and then is saved in the sticky annotation database DB2.

An example of a data structure within the sticky annotation database DB2 is shown in FIG. 4.

In the figure, the annotation ID column lists the respective annotations, and a unique ID No. is allocated to each of the annotations for one sticky. In this example, the annotation ID may be issued at the client system 94 side, or may be issued at the annotation management server 20 side. It is required that at least a group made up of the annotation ID and the document ID is unique. In the case where the given annotation ID or the group of two ID is not novel, a line indicated by the annotation ID or the group of two is overwritten.

The terminal ID is an ID No. that uniquely identifies the client device 50. In this example, the terminal ID may directly indicate the hardware of the client device 50 that is used by the user, or may correspond to an IP (internet protocol) address or a host name. Also, the user ID (or the user name) is information for uniquely identifying the user that operates the client device 50, and corresponds to a login user name or the like. In addition, a unique document ID No. is allocated for each of the documents that have been stored in the document database DB1. In this example, if the same document file name is submitted in the document database DB1 at plural times, the document file name is registered with a different document ID.

The position information indicates a position (attachment position) at which the annotation for one sticky is given within a document. In this embodiment, position information is indicated by the combination of page No. within the document indicated by the corresponding document ID and position coordinates (in this example, coordinates of two points of an upper left corner point and a lower right corner point of the annotation) on a page indicated by the page No. In this embodiment, the document display area 53C is sectioned, in lateral and longitudinal directions, into a matrix in a rectangular region of 1/60 times (1/60 size) in the longitudinal direction as much as the longitudinal size of the display document by the size (in this example, 1/50 of the lateral size of the display document in the lateral direction) based on the lateral size and the longitudinal size of the document that is displayed in the document display area 53C. Then, serial Nos. are given the respective sectional regions in the order from the upper left toward the lateral direction in advance, and the serial Nos. are applied as the position coordinates.

The display name of an annotation indicates a comment described on the annotation, and the link indicates link information associated with the annotation. In the document processing system 90 according to this embodiment, link information may be given by a path such as a URL, for example, "http://MessageServer/threadViewer?MessageId=1517" or a path of the directory, as shown in the figure as one example.

The user can set the display name and the link for each of the given annotations. The display name and the link can be set every time annotation is added or every time an instruction for saving an annotation is issued.

The publication attribute allows, for example, the annotation to be publishable (no limit) (=Pub), to be published within a specific other users or groups (=Frd), to be unpublished (for personal use) (=Priv), or to be published only when authentication is obtained (=Protect).

In the specific publication (=Frd) category and the authentication publication (=Protect) category, a sub-attribute such as a user, a group or an authentication code (user name and password) can be set. Also, in case of the specific publication or authentication publication, it is not limited to publication of only display (read only), but a sub-attribute of full access can be set that allows edition due to another person. It is needless to say that sharing access to the document or the annotation is normally published as read only. This is so that the inconvenience caused by allowing numerous users to freely edit a document or an annotation is prevented from occurring. However, it may also be convenient to freely edit the document or the annotation depending on the application mode. In this case, a full access setting may be used.

The user can set the publication attribute for each of the given annotations. The publication attribute can be set every time an annotation is given, or every time an instruction for saving an annotation is issued. Also, it is possible that any one of the attributes is set as a default in advance, and, in the case where an instruction for alteration is not issued, the attribute of the default is assumed to be set. Also, when there is no instruction for alteration of the publication attribute at the time of saving the annotation, the attribute set at that time remains.

Publication is allowed only when the authentication is obtained (=Protect). The publication is allowed only when password authentication is obtained through a predetermined procedure. Then, in displaying the annotation, all of the annotations including the annotation to be unpublished are transmitted to the client system 94 from the annotation management server 20. Then, the client system 94 side checks the publication attribute that is set to the annotation, and changes over display (publication) or non-display (non-publication), or the annotation management server 20 side transmits only the annotation to be published.

The status indicates any one of a state in which the annotation is newly prepared (=New), a state in which the annotation has already existed (=Exist), and a state in which the annotation is deleted (=Deleted). When the user eliminates the annotation that has been given once by an electronic eraser, the status becomes "Deleted". In this case, data of the annotation eliminated from the sticky annotation database DB2 is not eliminated according to the elimination instruction, but the status is merely altered. That is, in the case where a time at which the annotation is newly given, the attribute or the position is altered, an annotation generation time before alteration, an annotation generation time after alteration, and an elimination time of the eliminated annotation (not shown) are registered and managed in the sticky annotation database DB2 for each of the annotations as the access history of the annotation.

In displaying an annotation, all of the annotations including the annotation of "deleted" are transmitted to the client system 94 from the annotation management server 20. Then, the client system 94 checks the status that is set to the annotation, and changes over display or non-display, or the annotation management server 20 transmits only the annotation of "Exist" to the client system 94.

The generation time is a time at which the annotation for one sticky is given (drawn in the display area 53A) in the client device 50, and is made up of date and time. The generation time is managed in an integrated fashion by the server apart from the time that is designated and saved by the save button 74 in the client device 50, in each of the annotation for one sticky.

The reference time is information indicative of a reference time for each with respect to the linked information in the case where the annotation is linked. The reference time is made up of date and time. The information is updated every time a user refers to the linked information, and the time at which the linked information has been most recently referred to by the respective users can be accessed by the respective users.

In the case where a location of a previously added annotation is moved (that is, the position information is changed), or in the case where the publication attribute of an annotation is changed, the status of the original annotation is "Deleted" assuming that the original annotation has been practically deleted, and a new annotation ID is issued for the annotation of the latest state. With this operation, even if an annotation which was previously added is deleted or altered, all of the annotations including the "Deleted" annotation are transmitted to the client system 94 from the annotation management server 20. Then, the client system 94 side checks the status, and changes over display or non-display of the annotation whose status is "Deleted", thereby making it possible to reproduce a "Deleted" annotation in it's original state if required.

The above description is given of the case in which the annotation to be saved is a sticky annotation. In the case where the annotation to be saved is a handwritten input annotation, the annotation management server 20 registers the annotation as follows:

First, the annotation management server 20 receives, from the client device 50, the annotation contents of the annotation to be saved, the position information, the color and configuration of the annotation, the document ID of the document to which the annotation is added, and the terminal ID of the client device 50 that has instructed the saving. Also, in this situation, the annotation management server 20 receives, from the client device 50, a user name (or a user ID) of the user who has given the annotation to be saved, a publication attribute related to the annotation, a status indicative of the state (new, existence, elimination) of the annotation, and a time at which the annotation is given.

Then, the annotation management server 20 saves the annotation ID, the terminal ID, the user ID (or the user name), the document ID, the position information, the annotation contents, the color configuration, the line type, the publication attribute, the status, and the generation time, in the pen-based input annotation database DB3 in a table format. An example of a data structure within the pen-based input annotation database DB3 is shown in FIG. 5.

In the figure, the annotation ID, the terminal ID, the user ID, the document ID, the position information, the publication attribute, the status, and the generation time are the same as those in the abovementioned sticky annotation database DB2. An annotation ID, which is registered in the sticky annotation database DB2, is allocated for each sticky. On the contrary, an annotation ID that is registered in the pen-based input annotation database DB3 is allocated for each stroke.

This is a difference between the sticky annotation database DB2 and the pen-based input annotation database DB3.

The annotation contents comprise the locus information of the annotation for one stroke and data used for reproducing the drawn annotation. For example, the annotation contents are data of a bit map or vector data. The color configuration comprises a color of ink that is used for the annotation, and/or configuration information such as circle or rectangle. The line type indicates the thickness, and a state of solid line or dotted line for the annotation.

When the client device 50 detects that the retrieve button 76 is designated while a document is displayed in the document display area 53C of the display unit 53, the client device 50 notifies the annotation management server 20 of the information indicative of that fact. In response to this, the annotation management server 20 reads the information related to the annotation that is instructed to be retrieved from the sticky annotation database DB2 and from the pen-based input annotation database DB3.

That is, the annotation management server 20 receives the instruction of "retrieve" from the client device 50. In this situation, the annotation management server 20 receives the document ID and the information related to an annotation given range from the client device 50. Then, the annotation management server 20 retrieves the sticky annotation database DB2 and the pen-based input annotation database DB3 on the basis of this information (retrieve conditions), reads the information related to the annotation to be displayed, and transmits the information to the accessing client device 50.

In response to this, the client device 50 displays the annotation indicated by the information received from the annotation management server 20 on the accessed document in a superimposing manner. FIG. 2 shows an example in which the sticky annotation 86 and the handwritten input annotation 88 are displayed on a document 84.

Message Sharing Server 30 and Message Database DB4

The message sharing server 30 according to this embodiment functions as a bulletin board system by the user of the document processing system 90.

That is, when a message is written from any one of the client devices 50 to be dealt with in the document processing system 90, the message sharing server 30 registers the information related to the message in the message database DB4.

In the bulletin board system, normally, a first message is written together with a title by a user, and then the first message may be changed by the user or one or more different users. In this situation, titles corresponding to the title provided for the first message are provided for the messages other than the first message, thereby making it possible to access the parent-child relation of the respective messages with reference to the titles.

The message sharing server 30 sequentially registers the messages that have been written on the bulletin board system from the respective users together with the titles corresponding to the messages in the message database DB4. An example of a data structure within the document database DB4 is shown in FIG. 6.

In the figure, the message ID manages the respective messages, and a unique ID No. is allocated to each of the messages. The annotation ID may be issued at the client system 94 or at the message sharing server 30.

The update time is the time at which a message is written on the bulletin board system, and is made up of date and time. In this embodiment, the update time is registered by using date and hour information timed by a timer (not shown) which is located in the control unit 31 of the message sharing server 30. However, the present invention is not limited to this example. Information of the message writing time can also be given from the message writing client device 50 and registered.

A just-before message ID is information indicative of the message ID that is allocated to a parent message, and a just-after message ID is information indicative of the message ID that is allocated to a child message. In the document processing system 90 according to this embodiment, if a message is a first message, there is no parent message and the just-before message ID is "0". As the just-after message ID in the case of having no child message, the information ("0" in this embodiment) that cannot be obtained as the message ID is registered.

In an example shown in the figure, because the messages whose respective messages ID are "1517", "1518" and "1519" are "0" in the just-before message ID, it is understood that those messages are the first messages. Also, it is understood that the message whose message ID is "1519" is a first message because both of the just-before message ID and the just-after message ID are "0", and is a single message having no child message. In addition, it is understood that the message whose message ID is "1520" is a child message of the message whose message ID is "1517", and a message having no child message because the just-before message ID is "1517", and the just-after message ID is "0".

The title is information indicative of the title provided for the corresponding message, and the message is information indicative of the message body.

When the display of the bulletin board system is instructed by any one of the client devices 50, the message sharing server 30 reads the information related to the respective messages from the message database DB4, prepares information that allows a list of the titles of the respective messages which can identify the parent-child relation to be displayed, and then transmits the information to the accessing client device 50. In response to this, since the client device 50 displays the list of the titles of the respective messages by using the received information, the user of the client device 50 may point to a desired title by using the annotation device 56, or the keyboard or mouse of the operating unit 54, to thereby display a message corresponding to the title, or write a message with respect to the selected message.

Since an application mode of the bulletin board system is well known, further description of the application mode will be omitted.

Message Change Specifying Function

Figure 7:
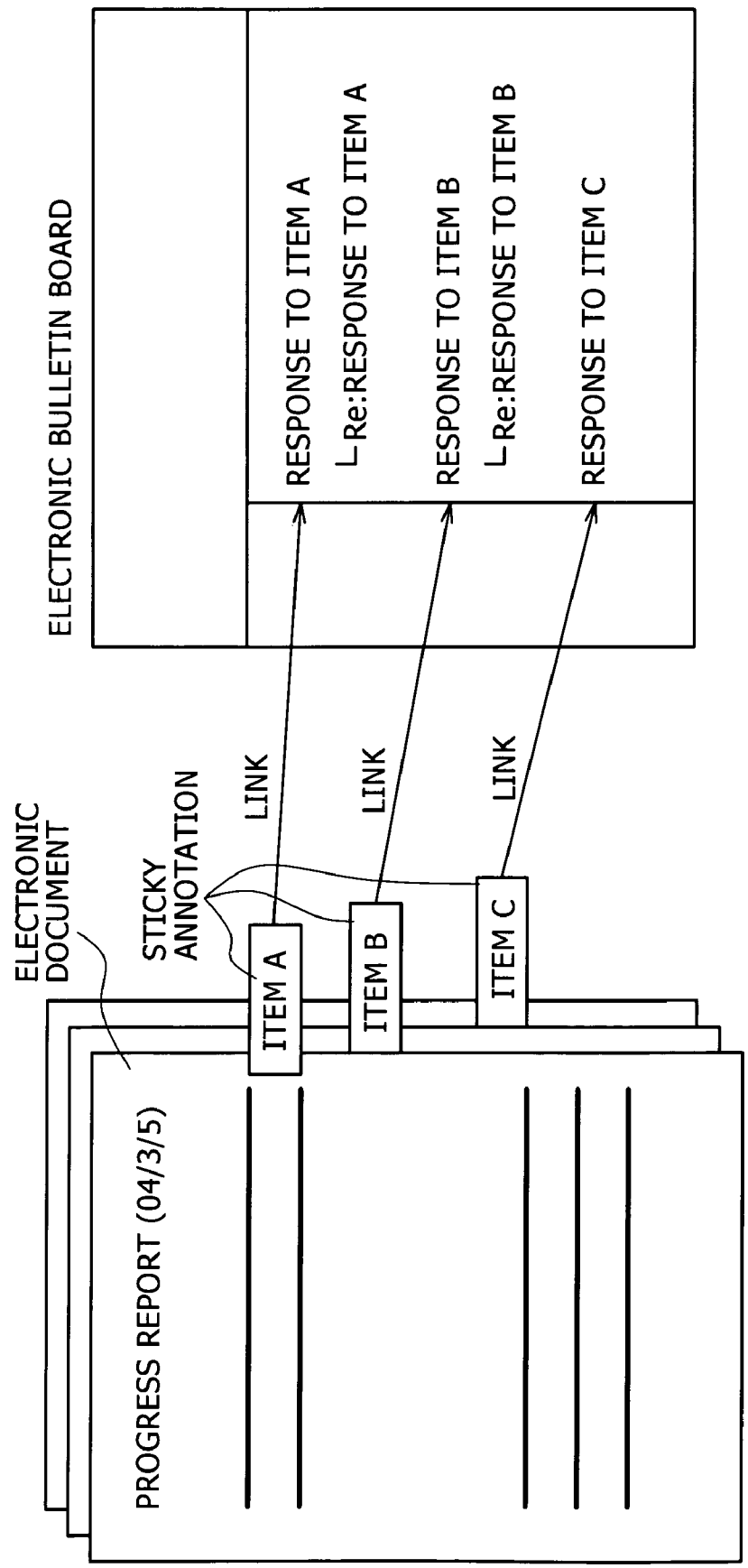
FIG. 7 is a schematic diagram showing a state in which link information for is associated with a sticky annotation according to an exemplary embodiment.

Incidentally, the document processing system 90 according to this embodiment can associate a sticky annotation that is attached to an electronic document with the link information for linking to a message written on the bulletin board system by means of the message sharing server 30 as schematically shown in FIG. 7 as one example.

In such a case, the document processing system 90 has a function which can change the display state of the sticky annotation when the message to which the sticky annotation is linked has been changed.

Figure 8:
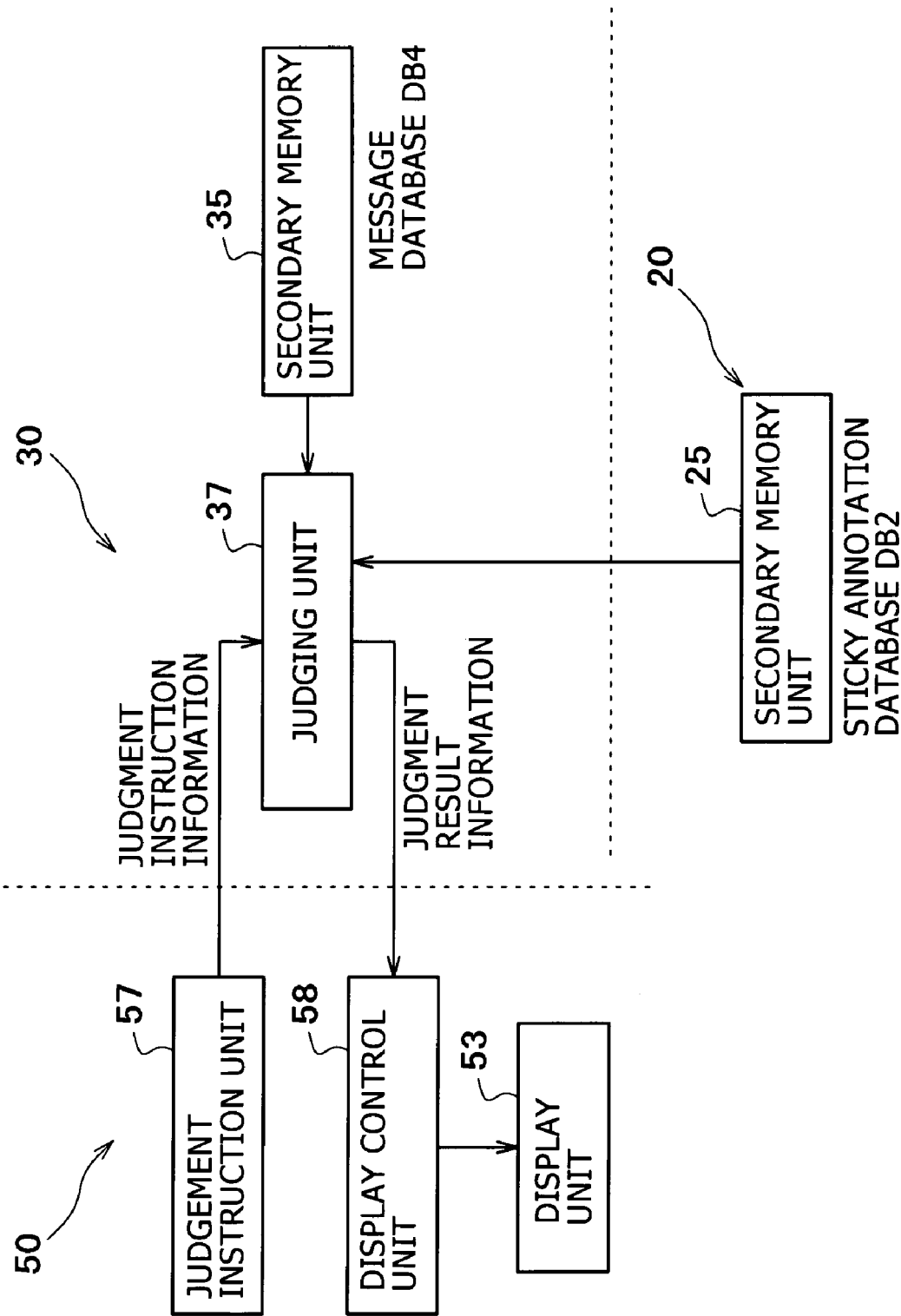
FIG. 8 is a block diagram showing the functional structure of a document processing system for executing a message change specifying function according to exemplary embodiment.

FIG. 8 is a block diagram showing the functional structure of a document processing system 90 for executing the above message change specifying function.

As shown in the figure, in order to execute the message change specifying function, each of the client devices 50 has a judgment instruction unit 57 and a display control unit 58, and the message sharing server 30 has a judging unit 37.

The judgment instruction unit 57, according to this embodiment, transmits instruction information (hereinafter referred to as "judgment instruction information") to the message sharing server 30 at a predetermined timing. The instruction comprises an instruction to execute a judgment of whether or not the state of linked information associated with the sticky annotation has changed since the user previously referred to the state of the linked information. In this embodiment, the timing at which an instruction input (designation of the update button 78 in this embodiment) is conducted by the user is applied as the above predetermined timing.

Also, when the judgment instruction information is inputted from the judgment instruction unit 57 of any client device 50, the judging unit 37, according to this embodiment, judges whether or not the state of the linked information associated with the sticky annotation was changed since the user of the accessing client device 50 previously referred to the state of the linked information. This judgment is performed on the basis of the information registered in the message database DB4 that is stored in the secondary memory unit 35 and in the sticky annotation database DB2 that is stored in the secondary memory unit 25 of the annotation management server 20. Then, the judging unit 37 transmits the information (hereinafter referred to as "judgment result information") indicative of the judgment result to the accessing client device 50.

The display control unit 58 according to this embodiment controls the display unit 53 so as to differ the display state of the sticky annotation to be judged according to the judgment result information that has been received from the judging unit 37. In this embodiment, the judgment result may be indicated by a change in the display color. However, the present invention is not limited to this example, and at least one of the configuration of the annotation, the display luminance (display density), the presence or absence of a blinking display, and the presence or absence of a reverse display can be changed to indicate judgment the result.

Incidentally, in the document processing system 90 according to this embodiment, the message change specifying function may be implemented by execution of software.

Herewith, the operation of the client device 50 and the massage sharing server 30 at the time of executing the message change specifying function will be described in more detail.

Figure 9:
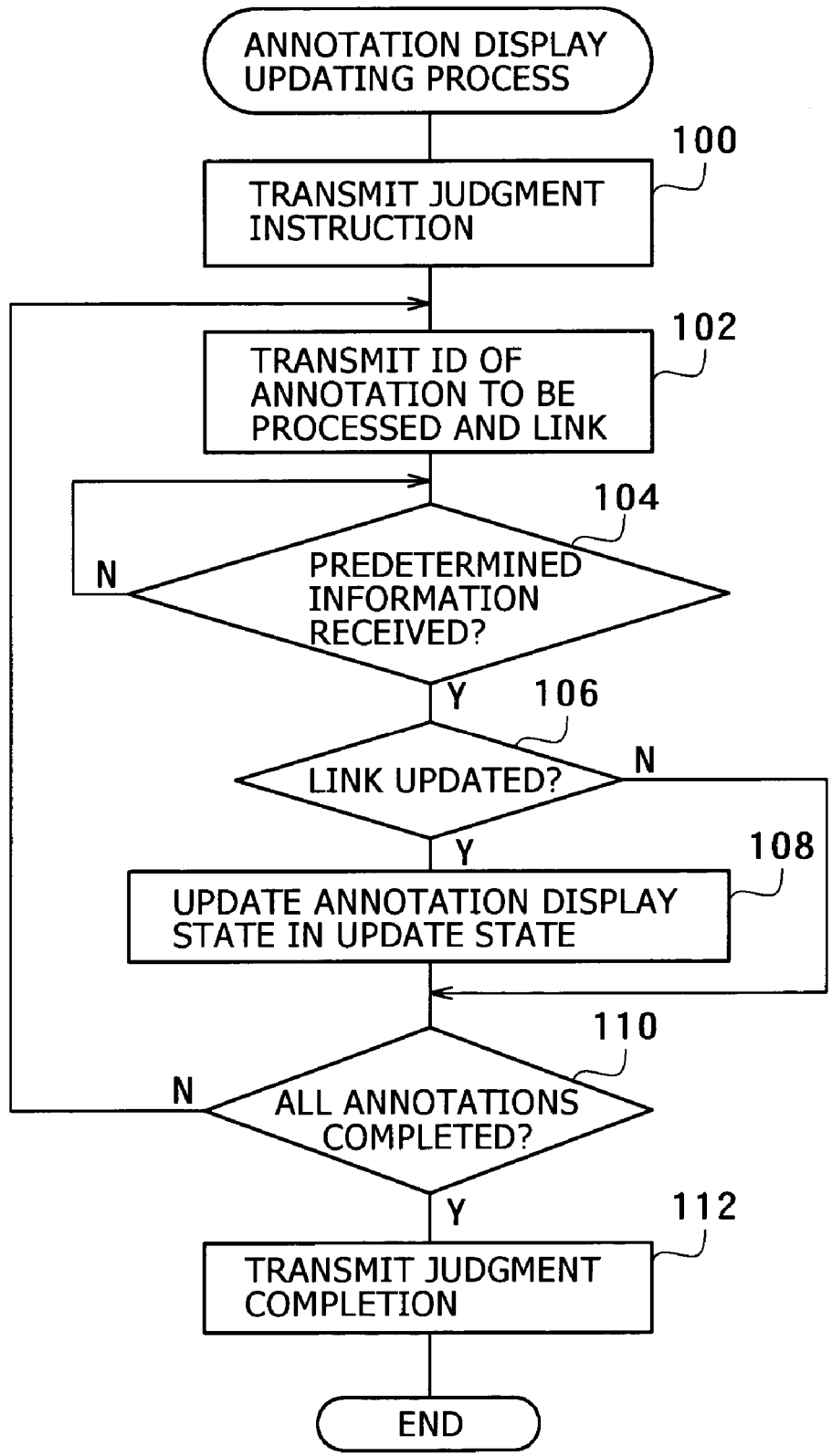
FIG. 9 is a flowchart showing a processing flow of an annotation display updating program according to a first exemplary embodiment.

First, the operation of the client device 50 at the time of executing the message change specifying function will be described with reference to FIG. 9. FIG. 9 is a flowchart showing a processing flow of an annotation display updating program that is executed by the control unit 51 of the client device 50 when the update button 78 is designated by the user in a state where the document, and the sticky annotation that is associated with the link information which is linked by the message sharing server 50 to a message written on the bulletin board system by the message sharing server 30 are displayed on the display unit 53 of the client device 50. The program is stored in a predetermined region of the main memory unit 52 in advance.

First, in Step 100 of the figure, the abovementioned judgment instruction information is transmitted from the client device 50 to the message sharing server 30, and in Step 102, the annotation ID of any annotation to be processed and the link information associated those the annotations are transmitted to the message sharing server 30.

Through the above processing, in the message sharing server 30, it is judged whether or not the state of the linked information associated with the sticky annotation to be judged has changed since the user of the accessing client device 50 has previously referred to the state by execution of an annotation judging program which will be described later. Then, the judgment result information indicative of the judgment result is transmitted, and the reception of the information is awaited in Step 104.

In Step 106, it is judged whether or not the judgment result indicated by the received judgment result information shows that the state of the linked information has changed (been updated). If the judgment is yes, processing is shifted to Step 108, and the display unit 53 is controlled in such a manner that the display state of the sticky annotation to be judged becomes a predetermined update state. Thereafter, processing is shifted to Step 110. In this embodiment, as the processing of the Step 108, control is made such that the sticky annotation is displayed with a warm color (red in an example).

On the other hand, if the judgment is no in the Step 106, processing is shifted to Step 110 without executing the processing of Step 108.

In Step 110, it is judged whether or not processing of the above Step 102 to Step 108 has been completed for all of the annotations to be processed. If the judgment is no, processing is returned to the Step 102, and processing is shifted to Step 112 at the time when the judgment is yes. When the processing of the above Step 102 to Step 110 is repeatedly executed, annotations which have not been to be processed up to that time are processed.

In Step 112, judgment completion information, indicative of the judgment execution completion due to the judgment instruction information that has been transmitted in Step 100, is transmitted to the message sharing server 30. Thereafter, the annotation display updating program is completed.

Figure 10:
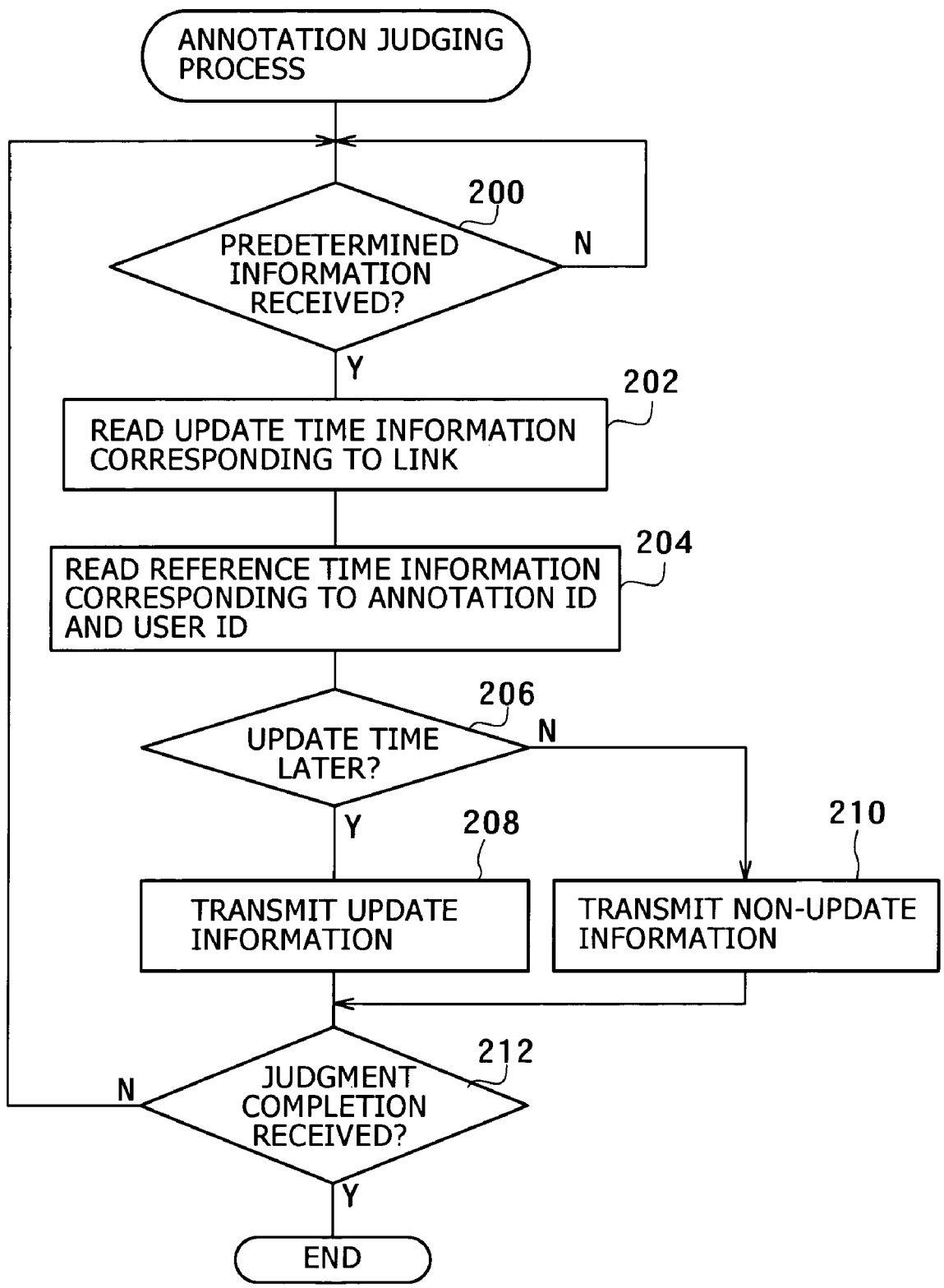
FIG. 10 is a flowchart showing a processing flow of an annotation judging program according to an exemplary embodiment.

The operation of the message sharing server 30 at the time of executing the message change specifying function will be described with reference to FIG. 10. FIG. 10 is a flowchart showing a processing flow of an annotation judging program that is executed by the control unit 31 of the message sharing server 30 at the time of receiving the judgment instruction information from a client device 50. The program is stored in a predetermined region of the main memory unit 32 in advance.

First, in Step 200 of the figure, the reception of predetermined information (annotation ID and link information) which is transmitted from the accessing client device 50 subsequently to the judgment instruction information is awaited. In Step 202, the update times of all the messages related to the link indicated by the received link information are read from the message database DB4 of the secondary memory unit 35. For example, in the case where the sticky annotation to be judged is a sticky annotation whose annotation ID is "0001" in the sticky annotation database DB2 shown in FIG. 4, because a message that is set with "1517" as the message ID is linked, "2004/3/4 10:10:15" corresponding to the message ID, and "2004/3/4 20:50:25" corresponding to a message that has been written in the above message and is set with "1520" as the message ID are read from the message database DB4 shown in FIG. 6 as the update times.

In Step 204, a reference time that corresponds to the annotation ID received in the above Step 200 and to the user ID for the user of the accessing client device 50 is read from the sticky annotation database DB2 through the annotation management server 20. In the case where a regular reference time has not been recorded in the sticky annotation database DB2 at that time, predetermined information, at a time that is always before the update time of the message that is written on the bulletin board system by means of the message sharing server 30, is read.

In Step 206, it is judged whether or not at least one of the update times that have been read in the above Step 202 is later than the reference time that has been read in the above Step 204. If the judgment is yes, it is assumed that the state of the linked message has changed from a time when the user of the accessing client device has previously referred to the state, and processing is then shifted to Step 208.

In Step 208, the update information indicating that the state of the linked message has changed from the previously referred time is transmitted to the accessing client device 50 as the judgment result information. Thereafter, processing is shifted to Step 212.

On the other hand, if the judgment is no in the above Step 206, it is assumed that the state of the linked message has not changed from the time when the user of the accessing client device has previously referred to the state, and processing is then shifted to Step 210. Then, the non-update information indicating that the state of the linked message has not changed from the previously referred time is transmitted to the accessing client device 50 as the judgment result information. Thereafter, processing is shifted to Step 212.

In Step 212, it is judged whether or not the judgment completion information is received from the accessing client device 50. If the judgment is no, processing is returned to the above Step 200, and the annotation judging program is completed when the judgment becomes yes.

Figure 11:
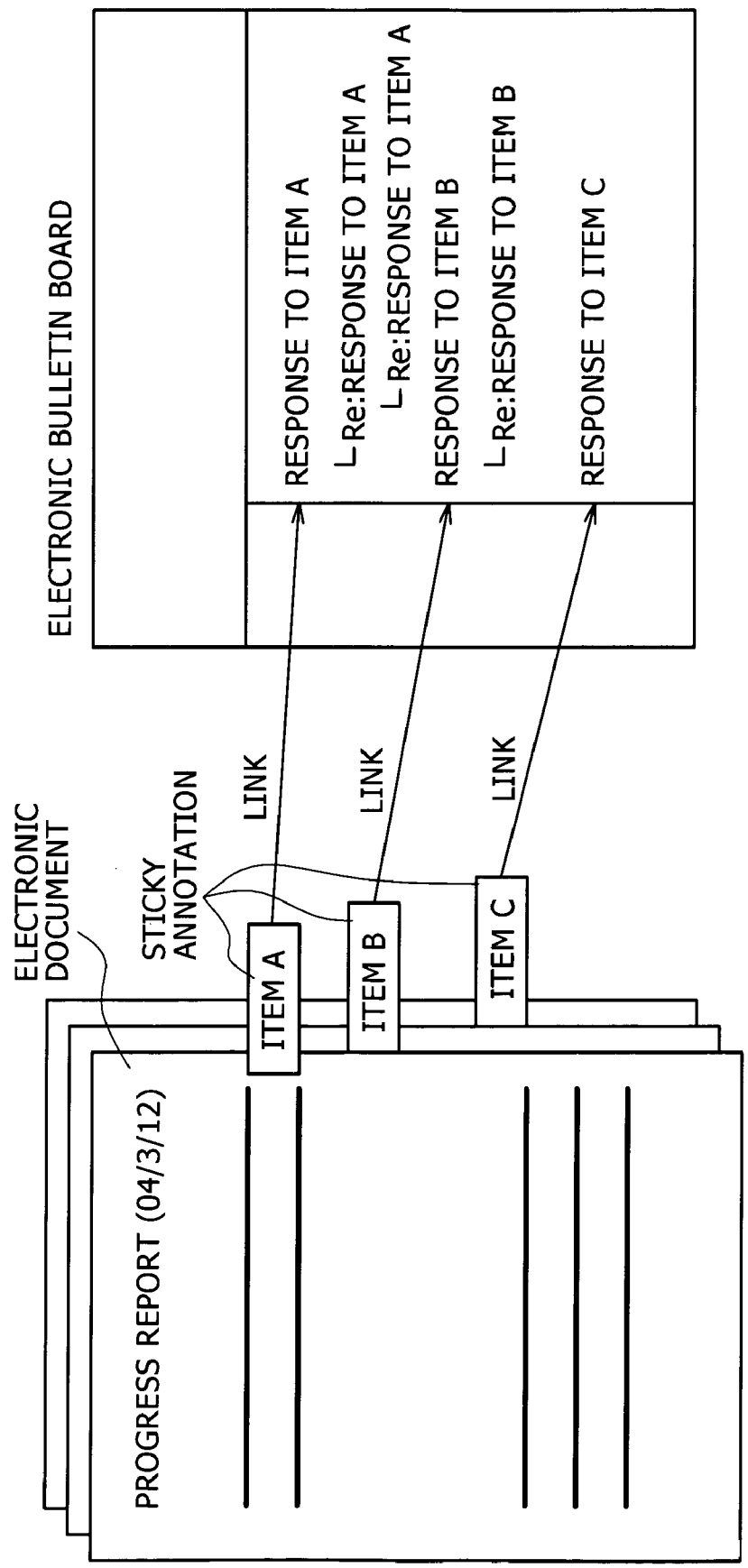
FIG. 11 is a schematic diagram showing an example of a change in a message state in a bulletin board system according to the first exemplary embodiment.

For example, in the case where the state of the message on the bulletin board system changes from a state shown in FIG. 7 to a state shown in FIG. 11, that is, in the case where a reply is added in reply to the message (message ID is "1520") having a title of "response to item A", information related to the newly-added reply is registered in the message database DB4 with a new message ID ("1522" in this example) as shown in FIG. 12. In this example, as shown in the figure, a time (update time) at which the message has been written on the bulletin board system is "2004/3/11 17:30:20".

Figure 13:
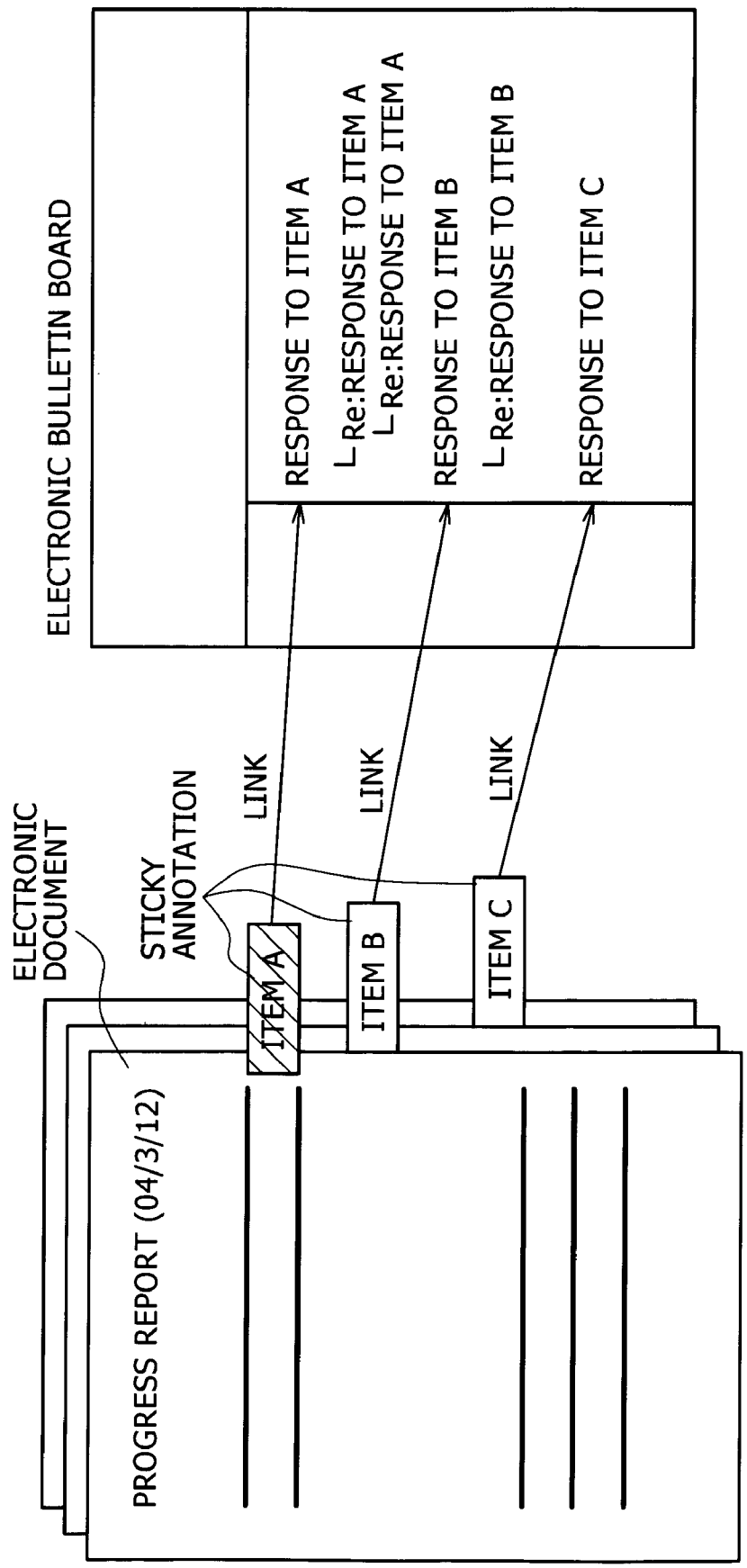
FIG. 13 is a schematic diagram showing an update example of a display state of a sticky annotation by the annotation display updating program according to the first exemplary embodiment.

On the other hand, in the case where the sticky annotation database DB2 is shown in FIG. 4, the message whose message ID is "1517" corresponds to the linked sticky annotation (the sticky annotation whose annotation ID is "0001"), and all of the reference times corresponding to the respective users of "User 1" to "User 4" are earlier than the above update time. As a result, in the case where the update button 78 that is displayed in the display unit 53 of the client device 50 which is operated by the user per se is designated by each of the users, the display state of the sticky annotation is displayed in a different state (display color in this example) from other annotations as shown in FIG. 13 as an example.

Incidentally, in the document processing system 90 according to this embodiment, a mark (not shown) indicating that a link is made, which is displayed with respect to the sticky annotation associated with the link information that is linked to the message written on the bulletin board system by means of the message sharing server 30 is pointed by the annotation device 56, or the keyboard or mouse of the operating unit 54, thereby making it possible to display the linked information on the display unit 53.

Figure 14:
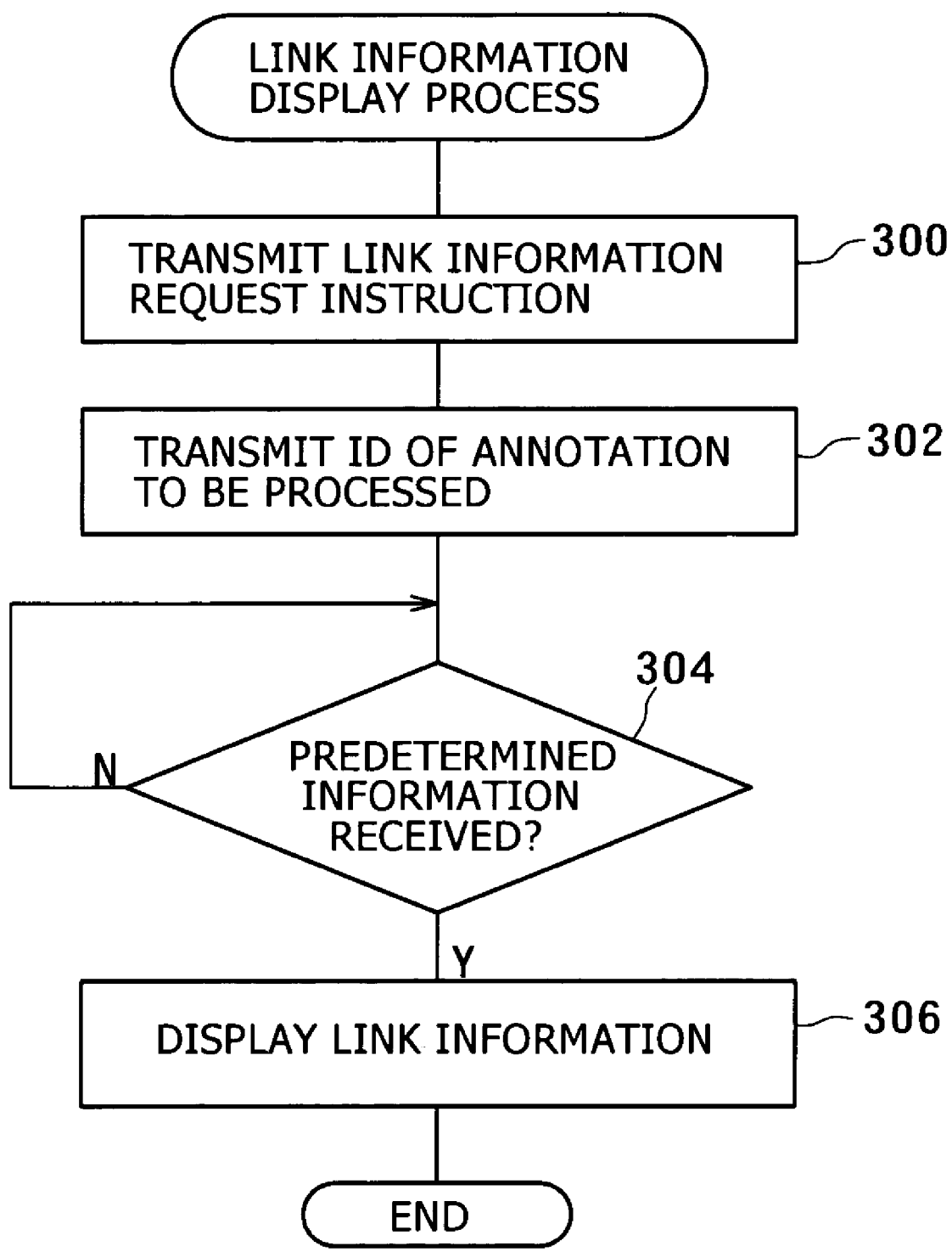
FIG. 14 is a flowchart showing a processing flow of a linked information displaying program according to an exemplary embodiment.

The operation of client device 50 when the above-described mark is designated by the user will be described with reference to FIG. 14. FIG. 14 is a flowchart showing a processing flow of a linked information displaying program that is executed by the control unit 51 of the client device 50. The program is stored in a predetermined region of the main memory unit 52 in advance.

First, in Step 300 of the figure, linked information request instruction information that requests the transmission of the linked information (the message written on the bulletin board system) is transmitted from a client device 50 to the message sharing server 30. In Step 302, the annotation ID of the sticky annotation corresponding to the mark that is designated by the user is transmitted to the message sharing server 30.

Through the above processing, in the message sharing server 30, since the linked information indicated by the link information that is associated with the above sticky annotation is transmitted by execution of the linked information transmitting program that will be described later, the reception of the linked information is awaited in succeeding Step 304.

In Step 306, the message indicated by the received linked information is displayed in a free space of the display unit 53, and thereafter the linked information displaying process is completed.

Figure 15:
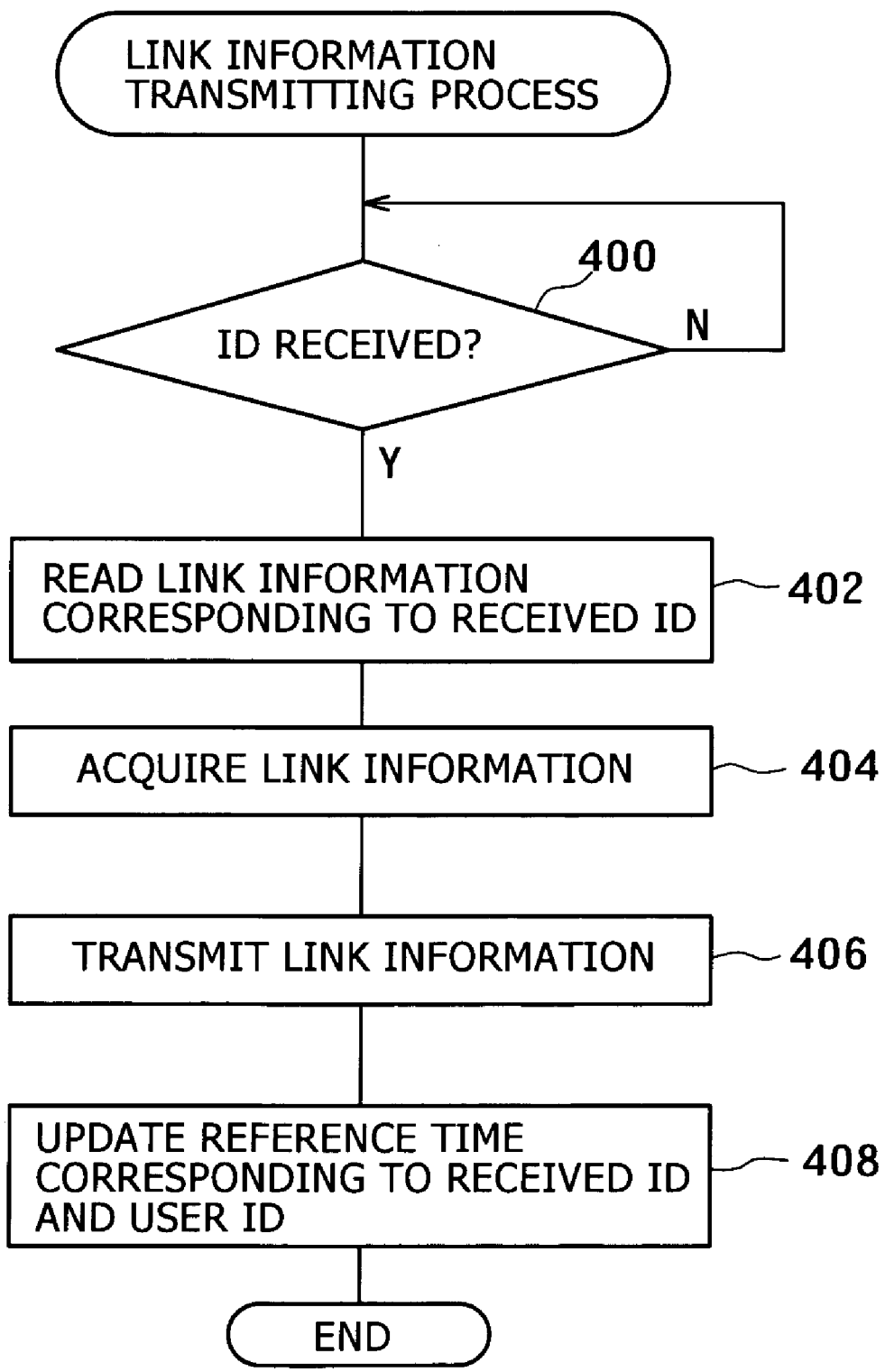
FIG. 15 is a flowchart showing a processing flow of a linked information transmitting program according to an exemplary embodiment.

The operation of the message sharing server 30 at the time of receiving the linked information request instruction information from any client device 50 will be described with reference to FIG. 15. FIG. 15 is a flowchart showing a processing flow of a linked information transmitting program that is executed by the control unit 31 of the message sharing server 30 in that situation. The program is stored in a predetermined region of the main memory unit 32 in advance.

First, in Step 400 of the figure, the reception of predetermined information (annotation ID) which is transmitted from the accessing client device 50 subsequently to the linked information request instruction information is awaited for. In Step 402, the link information corresponding to the receive annotation ID is read from the sticky annotation database DB2 through the annotation management server 20. In addition, in Step 404, the linked information (message) indicated by the read link information is read from the message database DB4.

In Step 406, the linked information read in the above Step 404 is transmitted to the accessing client device 50. In succeeding Step 408, a time at that point is stored (updated) as a reference time that corresponds to the annotation ID received in the above Step 400 and also corresponds to the user ID for the user of the accessing client device 50 in the sticky annotation database DB2 through the annotation management server 20. Thereafter, the linked information transmitting program is completed.

In the case where the sticky annotation is linked and the linked information is referred to by execution of the above linked information displaying program and linked information transmitting program, the time at that point where the linked information is referred to by the user is stored (updated) as the reference time of the linked information by the user in the sticky annotation database DB2.

As described above in detail, in this embodiment, control is made such that it is judged whether or not the state of the linked information associated with the sticky annotation attached to the electronic document has changed from a time at which each of the users previously referred to the linked information state. Then, the display state of the annotation associated with the link information to be judged varies according to the judgment result. As a result, it can be readily apparent to the user that the state of the linked information related to the descriptive content of the arbitrary position in the electronic document has changed from the previously referred to state.

In particular, in this embodiment, since the display state of the annotation may be represented by the display color of the annotation, it can be readily visually apparent that the linked information has changed.

In addition, in this embodiment, since the linked information is represented by the message on the bulletin board system, the state alternation of the message on the bulletin board system which has been widely employed up to now as a tool that supports a cooperative activity with a document such as the preparation of a device design or a device manual can be readily accessed by the user.

Second Embodiment

In a second embodiment, a description will be given of an example in which it is indicated that link information to be judged has changed since the user previously referred to the information because a new "child message has been added to the "parent" message to which the link information refers to. The structure of the document processing system 90 according to the second embodiment is identical with that in the first embodiment, and therefore its description will be omitted.

Figure 16:
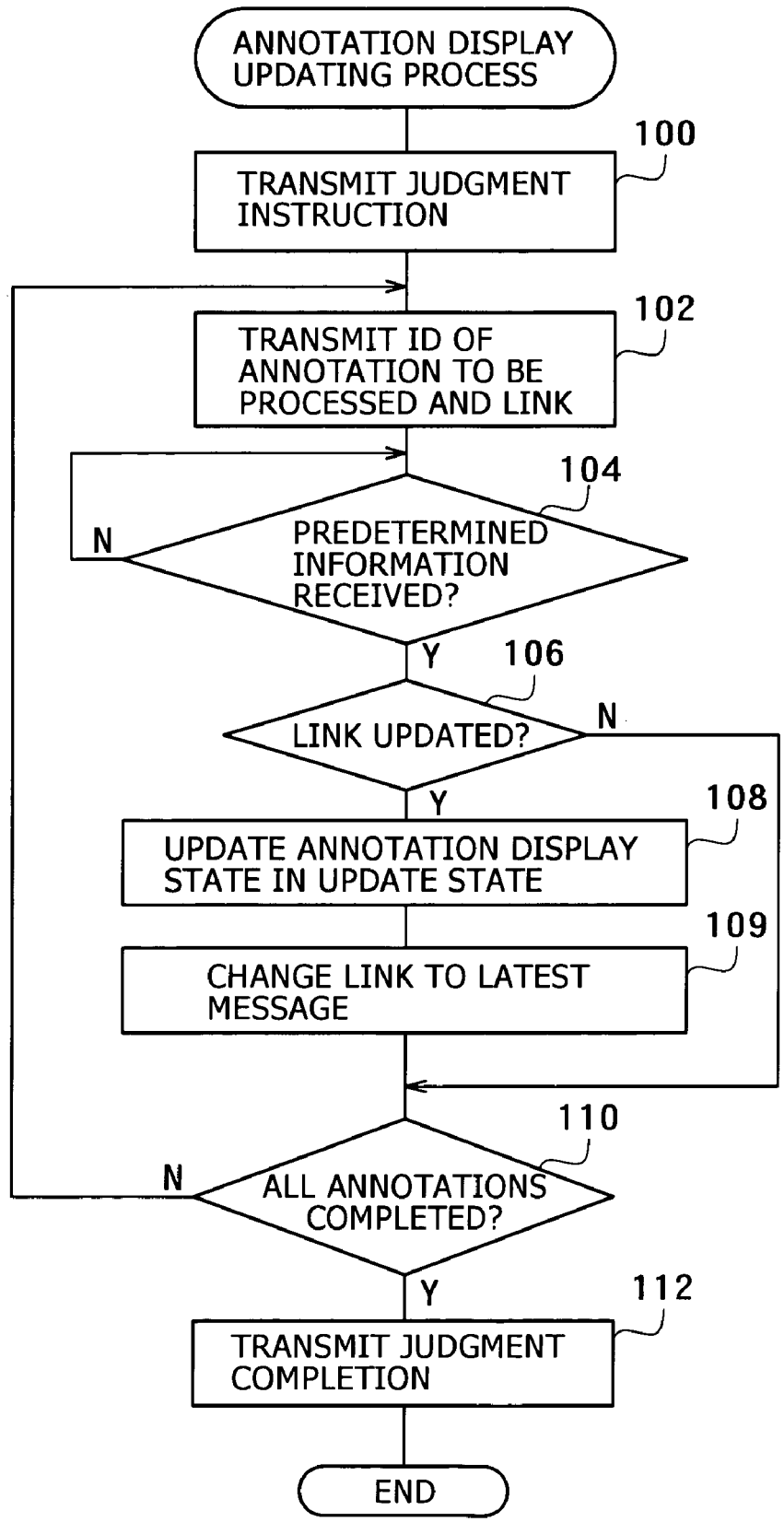
FIG. 16 is a flowchart showing a processing flow of an annotation display updating program according to a second exemplary embodiment.

Hereinafter, the operation of the client device 50 at the time of executing the message change specifying function will be described with reference to FIG. 16. FIG. 16 is a flowchart showing a processing flow of an annotation display updating program according to the second embodiment, which is executed by the control unit 51 of the client device 50 when the update button 78 is designated by the user in a state where the document, and the sticky annotation that is associated with link information linked by the message sharing server 30 to the message on the bulletin board system are displayed on the display unit 53 of the client device 50. The program is stored in a predetermined region of the main memory unit 52 in advance. The steps in FIG. 16 which conduct the same processing as that in FIG. 9 are denoted by identical step Nos. with those in FIG. 9, and their description will be omitted.

In the annotation updating program according to the second embodiment, upon receiving the judgment result information indicating that the state of the linked information has changed (been updated because a new "child" message has been added to the previously-linked "parent" message) from the message sharing server 30, a process of altering the link information associated with the sticky annotation to be judged to the link information of the most recently added message related to the previously-linked "parent" message indicated by the link information is executed in Step 109 as one example, as follows:

First, the linked just-after message ID indicated by the link information associated with the sticky annotation to be judged is referred to from the message database DB4 through the message sharing server 30, and it is judged whether a message subsequent to the "child" message (one step removed from the previously-linked "parent" message exists or not.

In the case where a subsequent message does not exist as a result of the judgment, the sticky annotation database DB2 is updated through the annotation management server 20 so that the link information of the sticky annotation to be judged is changed to link formation that links to the "child" message (one step removed from the previously-linked "parent" message.

On the other hand, in the case where a subsequent to the "child" message exists, the just-after message ID of the "child" message is referred to discover the subsequent message (2 steps removed from the previously-link "parent" message. It is then judged whether another message (3 steps removed from the previously-linked "parent" message) exists or not in the same manner as described above.

Subsequently, the above processing is repeated until the subsequent message does not exist, and the link information of the sticky annotation to be judged is updated. In the case where it is judged, by the linked just-after message ID indicated by the link information associated with the sticky annotation to be judged, that no subsequent message exists, the link information that is associated with the sticky annotation may not be updated.

In the case where the state of the message on the bulletin board system changes from a state shown in FIG. 7 to a state shown in FIG. 11, and the state of the message database DB4 is altered from a state shown in FIG. 6 to a state shown in FIG. 12, from a time at which the state was previously referred to by the user of the client device 50, by execution of the annotation display updating program according to the second embodiment, the link information (link) of the sticky annotation whose annotation ID is "0001" is altered from the link information shown in FIG. 4 to the link information shown in FIG. 17 (altered to the link information of the message whose message ID is "1522").

Figure 18:
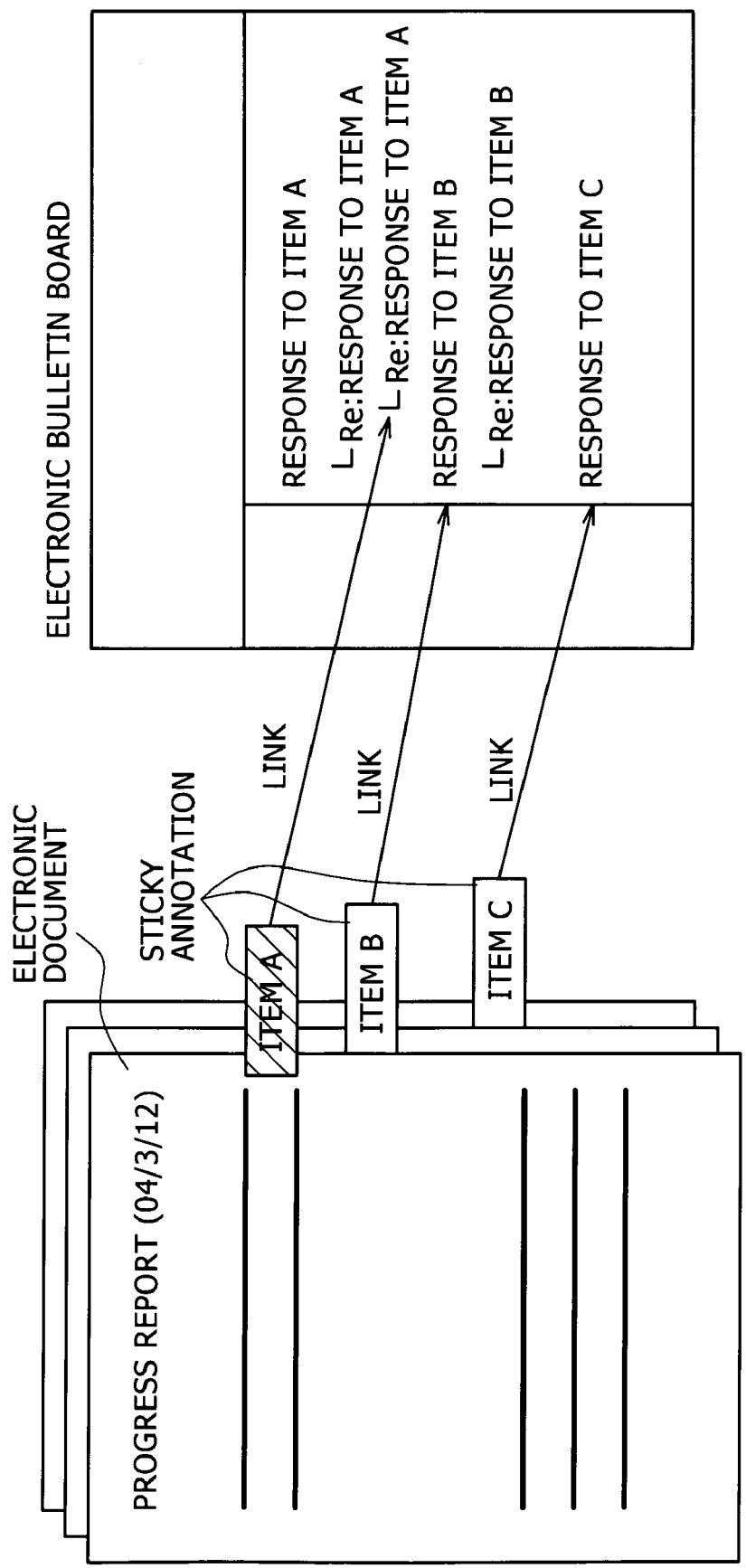
FIG. 18 is a schematic diagram showing an update example of a display state and a link of a sticky annotation by the annotation display updating program according to the second exemplary embodiment.

As a result, subsequently, in the case where a mark (not shown) indicating that a link displayed on the sticky annotation is made is designated in the client device 50, the latest message related to the message linked up to that time is displayed as shown in FIG. 18 as an example.

As described above in detail, in this embodiment, the same advantages as those in the above first embodiment can be obtained. Also, in the case where it is judged that the state of the linked information indicated by the link information has changed from a time at which the state was previously referred to, the link information to be judged is altered to link information indicative of a link of the most recently added message related to the linked message indicated by the link information. As a result, the most recent message can be directly referred to, and the convenience can be improved.

Third Embodiment

In a third embodiment, a description will be given of an example in which a new message is added, which is not associated with the link information to which an annotation refers, but is "related to" the link information to which the annotation refers. The structure of the document processing system 90 according to the third embodiment is identical with that in the first embodiment except for the data structure of the message database DB4, and therefore the data structure of the message database DB4 according to the third embodiment will be first described.

As an example, as shown in FIG. 19, the message database DB4 according to the third embodiment is added with the user ID indicative of the user who has written the corresponding message, and the related message ID indicative of the message ID of the subject message in the case where the related message exists in the corresponding message, as compared with that in the first and second embodiments (refer to FIG. 6).

In this embodiment, when a user writes a message on the bulletin board system, the user may designate a message that may be highly related to the subject message, to thereby register the related message ID in the message database DB4. However, the present invention is not limited to this structure. For example, there may be a mode in which a user other than the user who has written the new message may designate that the new message is highly related to another message, and a mode in which the message related to the message that has been newly written on the bulletin board system is automatically retrieved through the message sharing server 30 and the client device 50 by using an existing morphological analysis. Also, there is a mode in which information indicative of the users related to each other is stored in advance, and a message that has been written on the bulletin board system by a user related to the user writing the message is automatically extracted as a message that is high in the relativity with reference to the information. Further, there is a mode in which information indicative of origin messages that are highly related to each other is stored in advance, and a message related to the origin messages that are high in the relativity is automatically extracted as a message that is high in the relativity with reference to the information.

Figure 20:
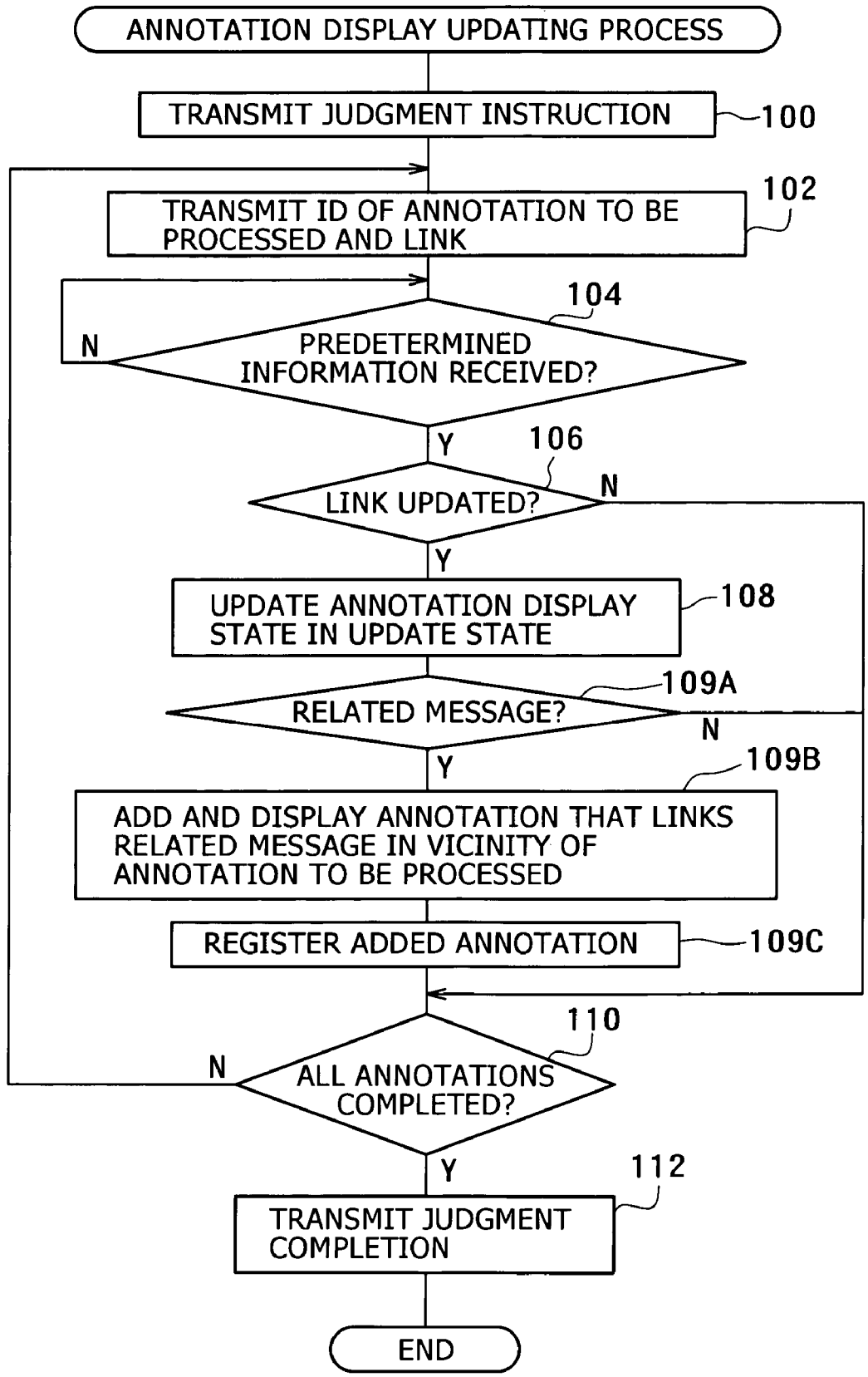
FIG. 20 is a flowchart showing a processing flow of an annotation display updating program according to the third exemplary embodiment.

Now, the operation of the client device 50 at the time of executing the message change specifying function will be described with reference to FIG. 20. FIG. 20 is a flowchart showing a processing flow of an annotation display updating program according to the third embodiment, which is executed by the control unit 51 of the client device 50 when the update button 78 is designated by a user in a state where the document, and a sticky annotation associated with the link information linked by the message sharing server 30 to a message written on the bulletin board system are displayed on the display unit 53 of the client device 50. The program is stored in a predetermined region of the main memory unit 52 in advance. The steps in FIG. 20 which conduct the same processing as that in FIG. 9 are denoted by identical step Nos. with those in FIG. 9, and their description will be omitted.

In the annotation display updating program according to the third embodiment, upon receiving the judgment result information indicating that the state of the linked information has changed (being updated) from the message sharing server 30, in Step 106, the message database DB4 is referred to through the message sharing server 30, and it is judged whether or not there exists a message (hereinafter referred to as "related message") where the message ID of the linked message indicated by the link information associated with the sticky annotation to be judged is registered as the related message ID (step 109A). If the judgment is yes, processing is shifted to Step 109B.

In Step 109B, the display unit 53 is controlled such that the sticky annotation associated with link information that links to the related message is additionally displayed in proximity to the sticky annotation to be judged.

In succeeding Step 109C, the information related to the sticky annotation that has been additionally displayed in the above Step 109B is transmitted to the annotation management server 20, to thereby additionally register the sticky annotation in the annotation database DB2. Thereafter, processing is shifted to Step 110.

If the judgment is no in the above Step 109A, processing is shifted to Step 110 without executing the processing of the above Steps 109B and 109C.

Figure 22:
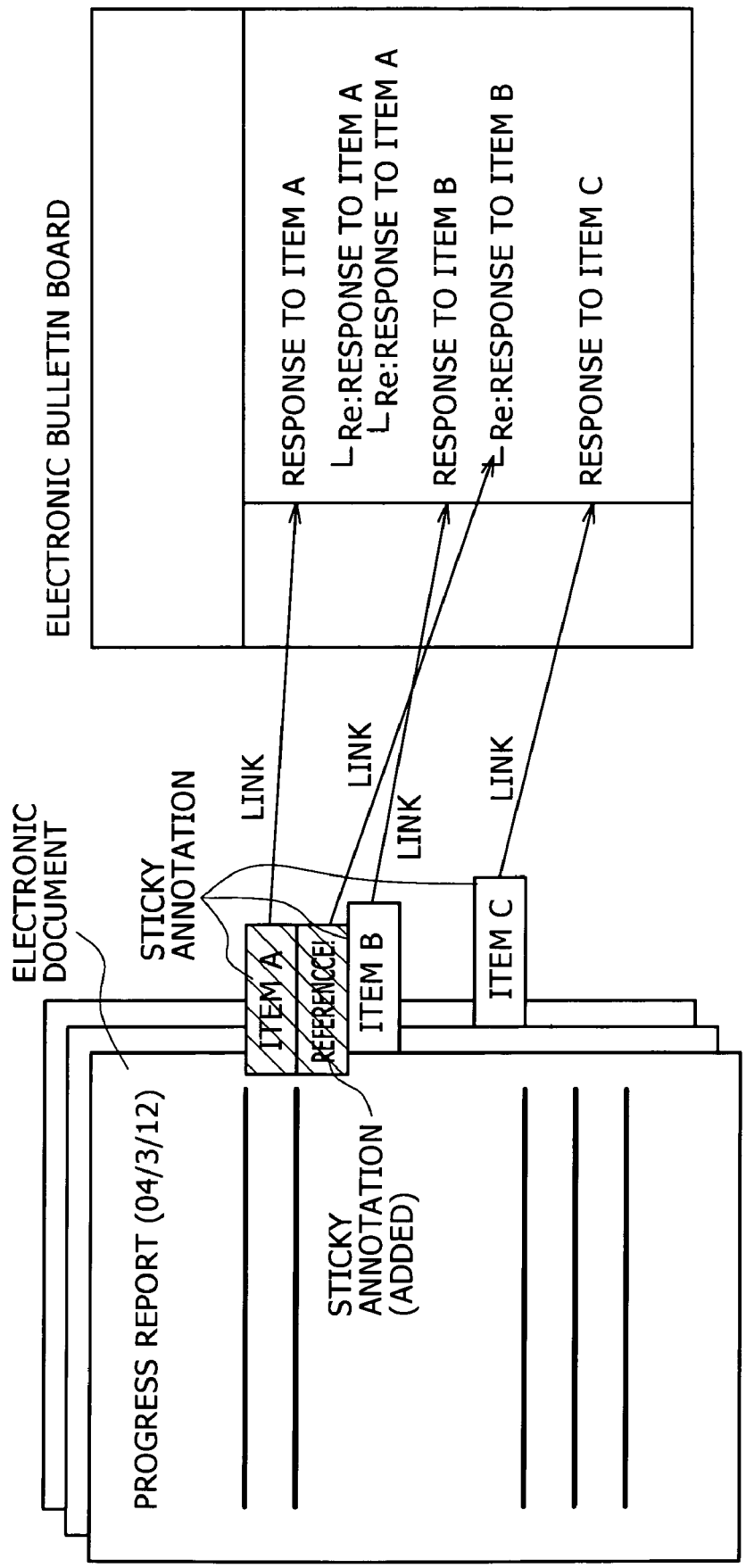
FIG. 22 is a schematic diagram showing an update example of a display state and a link of a sticky annotation by an annotation display updating program according to the third exemplary embodiment.

In the case where the state of the message on the bulletin board system changes from a state shown in FIG. 7 to a state shown in FIG. 11, and the state of the message database DB4 is shown in FIG. 19, from a time at which the state has been previously referred to by the user of the client device 50, by execution of the annotation display updating program according to the third embodiment, as shown in FIG. 21 as an example, the information (information whose annotation ID is "0006") that can display the sticky annotation associated with the link information that links the message related to the linked message indicated by the link information associated with the sticky annotation is newly registered in proximity to the sticky annotation whose annotation ID is "0001". Also, as shown in FIG. 22 as an example, display is conducted on the display unit 53 of the client device 50.

As described above in detail, in this embodiment, the same advantages as those in the above first embodiment can be obtained. Also, in the case where an annotation linked to a "related" message is newly disposed in proximity to the primary annotation, the user can readily grasp the information related to the linked information of the annotation, and the convenience can be improved.

The present invention is described above with reference to the embodiments. However, the technical scope of the present invention is not limited to scope of the above embodiments. The above embodiments can be variously modified or improved without departing from the subject matter of the present invention, and the modified or improved embodiments also fall within the technical scope of the present invention.

Also, the above embodiments do not limit the claimed invention, and all of the combinations of the features described in the above embodiments are not essential to the solving unit of the present invention. The abovementioned embodiments comprehend the present invention of various stages, and various inventions can be extracted from appropriate combinations of plural structural elements disclosed therein. Further, all the structural elements described in the above embodiments are not necessary to the present invention.

For example, in the above embodiments, a case in which a sticky annotation is applied as an annotation that is associated with link information is described. However, the present invention is not limited to this structure, and for example, a handwritten input annotation can be applied. In this case, the handwritten input annotation can be associated with the link information. Also, in the case where the state of the linked information indicated by the link information has changed since the user previously referred to the information, the display state such as the color, configuration or luminance of the handwritten input annotation is differed from another case. Likewise, in this case, the same advantages as those in the above respective embodiments can be obtained.

Also, in the above respective embodiments, the description is given of a case in which it is judged whether the state of linked information has changed or not at a timing designated through the update button 78 by the user. However, the present invention is not limited to this structure. For example, judgment can be conducted every given period of time (for example, every 1 second). In this case, the judgment instruction unit 57 shown in FIG. 8 can be deleted. As a result, the structure can be simplified, and a change in the state of the linked information can be accessed by the user in real time. Also, the above judgment can be conducted at a timing designated by the retrieve button 76 instead of the update button 78.

Also, in the above embodiments, a description is given of a case in which the display state of an annotation is changed when any information having the linked information as an origin changes after the user has referred to only a part (origin message) of the linked information. However, the present invention is not limited to this structure. For example, in the case where any information having the linked information as the origin changes after the user has referred to all of the linked information (all of the information having the linked state as the origin), the display state of the annotation can be changed. Similarly, in this case, the same advantages as those in the above respective embodiments can be obtained.

Also, for example, in the above embodiments, handwriting input using the annotation device 56 is implemented by a touch panel system. However, the present invention is not limited to this structure. For example, the handwriting input can be implemented by a detection mechanism of an electromagnetic induction system. Similarly, in this case, the same advantages as those in the above respective embodiments can be obtained.

Also, in the above embodiments, handwriting input is implemented by means of the pen-based annotation device 56. However, the present invention is not limited to this structure. For example, handwriting input can be implemented by means of an input/instruction device such as a keyboard or a mouse. In this case, since it is unnecessary to use a tablet PC as the client device 50, the document processing system 90 can be constituted at a low cost.

Also, in the above embodiments, the present invention is applied to a client/server system. However, the present invention is not limited to this structure. For example, the present invention can be applied to a P2P (peer to peer) system, or applied to a single (stand alone) information processor. In the case where the present invention is applied to a P2P system, the processing of the judging unit 37 described in the above respective embodiments may be executed in the client devices. Also, in the case where the present invention is applied to a single information processor, the processing of the judging unit 37 described in the above embodiments may be executed in an information processor. In this case, it is unnecessary to provide the processing or structure for transmitting and receiving the information between the respective devices. Similarly, in those cases, the same advantages as those in the above respective embodiments can be obtained.

Also, in the above embodiments, the document management server 10, the annotation management server 20 and the message sharing server 30 are constituted separately. However, the present invention is not limited to this structure. For example, the functions of the respective servers can be implemented by a single (stand alone) information processor such as a PC or a workstation. Similarly, in this case, the same advantages as those in the above respective embodiments can be obtained.

Also, in the above embodiments, the message change specifying function is implemented by software. However, the present invention is not limited to this structure. For example, the processing can be implemented by hardware. As an example in this case, a function device that operates in the same manner as that of the judging unit 37 shown in FIG. 8 as an example can be disposed in the message sharing server 30, and a function device that operates in the same manner as that of the judgment instruction unit 57 and the display control unit 58 shown in FIG. 8 as an example can be disposed in the respective client devices 50. In this case, the high-speed processing of the message change specifying function can be expected as compared with the above respective embodiments.

Also, the data structures of the databases shown in the above embodiments (refer to FIGS. 3 to 6 and 19) are examples. An item that is stored if required can be added, or an unnecessary item can be deleted. Also, that the stored contents of the respective items can be appropriately altered. For example, the respective information of "publication attribute" and "status" is not always necessary in the sticky annotation database DB2 shown in FIG. 4, and can be deleted.

Also, the processing flows of the various processing programs shown in the above embodiments (refer to FIGS. 9, 10, 14 to 16, and 20) are also examples, and can be appropriately altered within the subject matter of the present invention.

In addition, the allocation of the respective functional elements among the server system 92 and the client system 94 is not limited to that described in the above respective embodiments, and those functional elements may be redistributed in structuring the system.

As described above, according to an embodiment of the present invention, there is provided a document processor having a function of attaching additional information to an electronic document and a function of associating link information indicative of a link with the additional information, including a display unit that displays the electronic document, the additional information that is attached to the electronic document and linked information indicated by the link information that is associated with the additional information, a judging unit that judges whether or not a state of the linked information indicated by the link information changes from a state of the linked information at the time of previously referring to the linked information for each user, and a display control unit that controls the display unit so that a display state of the additional information associated with the link information to be judged varies according to a judgment result from the judging unit.

A document processor according to this embodiment of the present invention includes the function of attaching the additional information to the electronic document, the function of associating the link information indicative of a link with the additional information, and the display unit that displays the electronic document, the additional information that is attached to the electronic document and the linked information indicated by the link information that is associated with the additional information. The additional information includes character information, image information or sound information. Also, the display unit includes a display device having a display such as a liquid crystal display, a plasma display, an organic EL display, or a CRT display.

In this embodiment of the present invention, a judging unit judges whether or not the state of the linked information indicated by the link information changes from the state of the linked information at the time of previously referring to the linked information for each user, and the display control unit controls the display unit so that the display state of the additional information associated with the link information to be judged varies according to the judgment result from the judging unit.

As described above, according to the document processor of this embodiment of the present invention, since control is made such that it is judged whether or not the state of the linked information associated with the additional information (annotations) attached to the electronic document has changed since user last referred to the linked information for each user, and the display state of the additional information associated with the link information to be judged varies according to the judgment result. With the above structure, it can be readily apparent to the user that the state of the linked information related to the descriptive content of the arbitrary position in the electronic document has changed since it was previously referred to.

In another embodiment of the present invention, the display state of the additional information may include at least one of a color, a configuration and luminance of the additional information, presence or absence of blink display and presence or absence of reverse display.

Also, in another embodiment of the present invention, the linked information may be a message on the bulletin board system.

In particular, this embodiment of the present invention may further include a changing unit that changes the link information associated with an annotation to link information indicative of a link with the latest message related to a linked message indicated by the link information when it is judged by the judging unit that the state has changed.

In addition, another embodiment of the present invention may further include a link information adding unit that newly provides additional information associated with the link information indicative of the link with the information in proximity to the additional information when the information related to the linked information associated with the additional information is the linked information that is not associated with the additional information.

On the other hand, in order to achieve the present invention, according to another embodiment of the present invention, there is provided a document processing method in a document processor including a function of attaching additional information to an electronic document, a function of associating link information indicative of a link with the additional information, and a display unit that displays the electronic document, the additional information that is attached to the electronic document and linked information indicated by the link information that is associated with the additional information, including judging whether or not a state of the linked information indicated by the link information has changed since the last time it was referred to by each user, and controlling the display unit so that a display state of the additional information associated with the link information to be judged varies according to the judgment result.

Accordingly, according to the document processing method of this embodiment of the present invention, since the same action as that in one of the other embodiments of the present invention is conducted, it can be readily grasped by the user that a state of linked information related to the descriptive content of an arbitrary position in the electronic document has changed from a state that has been previously referred to as in the other embodiment of the present invention.

In anther embodiment of the present invention, the linked information may include a message on a bulletin board system.

On the other hand, in order to achieve the present invention, according to anther embodiment of the present invention, there is provided a storage medium readable by a computer, the storage medium storing a program of instructions executable by the computer in a document processor including a function of attaching additional information to an electronic document, a function of associating link information indicative of a link with the additional information, and a display unit that displays the electronic document, the additional information that is attached to the electronic document and linked information indicated by the link information that is associated with the additional information, to perform a function to process a document, the function including: judging whether or not a state of the linked information indicated by the link information has changed since it was previously referred to for each user; and controlling the display unit so that a display state of the additional information associated with the link information to be judged varies according to a judgment result in the judging.

Therefore, according to the document processing program of this embodiment of the present invention, since the same action as that in one of the other embodiments of the present invention is conducted on the computer, it can be readily apparent to the user that a state of linked information related to the descriptive content of an arbitrary position in the electronic document changes from a state that has been previously referred to as in the other embodiment of the present invention.

In another embodiment of the present invention, the linked information may be a message on a bulletin board system.

According to another embodiment of the present invention, control is made such that it is judged whether or not the state of linked information that is associated with additional information attached to the electronic document has changed since it was previously referred to for each user, and the display state of the additional information associated with the link information to be judged varies according to the judgment result. With the above structure, it can be readily apparent to the user that the state of the linked information related to the descriptive content of the arbitrary position in the electronic document has changed since it was last referred to.

The foregoing description of the exemplary embodiments of the present invention has been provided for the purposes of illustration and description. It is not intended to be exhaustive or to limit the invention to the embodiment described. Obviously, many modifications and variations will be apparent to practitioners skilled in the art. The embodiments were chosen and described in order to best explain the principles of the invention and its practical applications, thereby enabling those skilled in the art to understand the invention for various embodiments and with the various modifications as are suited to the particular use contemplated. It is intended that the scope of the invention be defined by the following claims and their equivalents.

What is claimed is:

1. A document processor for managing an electronic document, comprising:
   an association unit that associates an annotation with a physical position in a document, the annotation having being associated with second information wherein the second information is a message on a messaging system;
   a display unit that displays the document and the annotation at the physical position in the document;
   a judging unit that judges whether the second information has changed since the document was last viewed by a user;
   a control unit that indicates to the user when the second information has changed since the document was last viewed by, the user; and a linking unit that links the second information to the annotation,
   wherein the display unit displays the annotation and the second information when the second annotation has changed since the document was last viewed by the user.

2. The document processor according to claim 1, wherein the control unit indicates to a user when the second information has changed by one of: changing a color of the annotation, changing a luminance of the annotation, and blinking a display of the annotation.

3. The document processor according to claim 1, wherein the judgment by the judging unit is conducted in every predetermined period of time.

4. The document processor according to claim 1, wherein the second information is part of a tree structure.

5. A document processor for managing an electronic document, comprising:
   association means for associating an annotation with a physical position in a document;
   display means for displaying the document and the annotation at the physical position in the document;
   judging means for judging whether the annotation has changed since the document was last viewed by a user;
   control means for indicating to the user when the annotation has changed since the document was last viewed by the user; and
   linking means for linking additional information to the annotation, wherein the additional information is a message on a bulletin board system and
   updating means for updating the annotation when a new message, responding to the original message linked to the annotation, is added on the bulletin board system, such that the updating means links the annotation to the new message.

6. A document processor for managing an electronic document, comprising:
- association means for associating an annotation with a physical position in a document;
- display means for displaying the document and the annotation at the physical position in the document;
- judging means for judging whether the annotation has changed since the document was last viewed by a user;
- control means for indicating to the user when the annotation has changed since the document was last viewed by the user;
- linking means for linking additional information to the annotation, wherein the additional information is a message on a bulletin board system; and
- updating means for adding a new annotation in proximity to the original annotation, if a new message, having a subject matter related to the original message linked to the original annotation, is added on the bulletin board system,
- wherein the linking means links the new annotation to the new message.

7. The document processing method according to claim 6, wherein the new annotation in proximity to the original annotation is adjacent to the original annotation.

8. The document processing method according to claim 6, wherein the new annotation in proximity to the original annotation abuts the original annotation.

9. A document processor for managing an electronic document, comprising:
- a controller that associates an annotation with a physical position in a document, the annotation having being associated with second information, wherein the second information is a message on a messaging system;
- a display unit that displays the document and the annotation at the physical position in the document;
- a judging unit that judges whether the second information has changed since the document was last viewed by a user, wherein the controller links the second information to the annotation,
- wherein the controller indicates to a user when the second information has changed since the document was last viewed by the user, and the display unit displays the annotation and the second information when the second information has changed since the document was last viewed by the user.

10. The document processor according to claim 9, wherein the controller indicates to a user when the second information has changed by one of: changing a color of the annotation, changing a luminance of the annotation, and blinking the display of the annotation.

11. The document processor according to claim 9, wherein the judgment by the judging unit is conducted in every predetermined period of time.

12. The document processor according to claim 9, wherein the second information is part of a tree structure.

13. A document processor for managing an electronic document, comprising:
- a controller which associates an annotation with a physical position in a document;
- a display which displays the document and the annotation at the physical position in the document; and
- a judging unit which judges whether the annotation has changed since the document was last viewed by a user;
- wherein the controller indicates to a user when the annotation has changed since the document was last viewed by the user,
- wherein the controller links additional information to the annotation, and
- wherein the controller updates the annotation when a new message, responding to the original message linked to the annotation, is added on the bulletin board system, such that the controller links the annotation to the new message.

14. A document processor for managing an electronic document, comprising:
- a controller which associates an annotation with a physical position in a document;
- a display which displays the document and the annotation at the physical position in the document; and
- a judging unit which judges whether the annotation has changed since the document was last viewed by a user,
- wherein the controller indicates to a user when the annotation has changed since the document was last viewed by the user,
- wherein the controller links additional information to the annotation,
- wherein the additional information is a message on a bulletin board system, and
- wherein the controller adds a new annotation in proximity to the original annotation, if a new message, having a subject matter related to the original message linked to the original annotation, is added on the bulletin board system, and the controller links the new annotation to the new message.

15. A document processing method, comprising:
- associating an annotation with a physical position in a document, the annotation being associated with second information, wherein the second information is a message on a messaging system;
- displaying the document and the annotation at the physical position in the document;
- judging whether the second information has changed since the document was last viewed by a user;
- indicating to the user when the second information has changed since the document was last viewed by the user, and linking the second information to the annotation,
- wherein the annotation and the second information are displayed when the second information has changed since the document was last viewed by the user.

16. The document processing method according to claim 15, wherein indicating to the user when the second information has changed comprises one of changing a color of the annotation, changing a luminance of the annotation, and blinking a display of the annotation.

17. The document processing method according to claim 15, wherein the judging is conducted in every predetermined period of time.

18. The document processing method according to claim 15, wherein the second information is part of a tree structure.

19. A document processing method, comprising:
- associating an annotation with a physical position in a document;
- displaying the document and the annotation at the physical position in the document;
- judging whether the annotation has changed since the document was last viewed by a user;
- indicating to the user when the annotation has changed since the document was last viewed by the user;
- linking additional information to the annotation, wherein the additional information is a message on a bulletin board system; and when a new message, responding to the original message linked to the annotation, is added on the bulletin board system:

linking the annotation to the new message.

20. A document processing method, comprising:

associating an annotation with a physical position in a document;

displaying the document and the annotation at the physical position in the document;

judging whether the annotation has changed since the document was last viewed by a user;

indicating to the user when the annotation has changed since the document was last viewed by the user;

linking additional information to the annotation, wherein the additional information is a message on a bulletin board system; and if a new message, having a subject matter related to the original message linked to the annotation, is added on the bulletin board system: adding a new annotation, in proximity to the original annotation, and linking the new annotation to the new message.

21. The document processing method according to claim 20, wherein the new message is not added in reply to the original message linked to the annotation.

22. A computer readable medium storing a program causing a computer to execute a process, the process comprising:

associating an annotation with a physical position in a document, the annotation having being associated with second information, wherein the second information is a message on a messaging system, displaying the document and the annotation at the physical position in the document;

judging whether the second information has changed since the document was last viewed by a user;

indicating to the user when the second information has changed since the document was last viewed by the user, and linking the second information to the annotation, wherein the annotation and second information are displayed when the second information has changed since the document was last viewed by the user.

23. The computer readable medium according to claim 22, wherein the second information is part of a tree structure.

* * * * *